US012303446B2

(12) United States Patent
Christiansen

(10) Patent No.: US 12,303,446 B2
(45) Date of Patent: May 20, 2025

(54) REHABILITATIVE AND CORRECTIVE SYSTEM, STRENGTH SYSTEM, RECOVERY SYSTEM, MUSCLE ACTIVATION SYSTEM, AND METHODS OF USE

(71) Applicant: Tyler Christiansen, San Antonio, TX (US)

(72) Inventor: Tyler Christiansen, San Antonio, TX (US)

( * ) Notice: Subject to any disclaimer, the term of this patent is extended or adjusted under 35 U.S.C. 154(b) by 758 days.

(21) Appl. No.: 17/583,279

(22) Filed: Jan. 25, 2022

(65) Prior Publication Data

US 2023/0141103 A1 May 11, 2023

Related U.S. Application Data

(60) Provisional application No. 63/276,735, filed on Nov. 8, 2021.

(51) Int. Cl.

| | |
|---|---|
| ***A61H 1/02*** | (2006.01) |
| ***A63B 1/00*** | (2006.01) |
| ***A63B 21/00*** | (2006.01) |

(52) U.S. Cl.
CPC ................. *A61H 1/02* (2013.01); *A63B 1/00* (2013.01); *A63B 21/00047* (2013.01);
(Continued)

(58) Field of Classification Search
CPC .............. A61H 1/02; A61H 2001/0203; A61H 2001/0157; A63B 1/00; A63B 1/005; A63B 21/00047; A63B 21/0005; A63B 21/00054; A63B 21/00185; A63B 21/068; A63B 21/4027; A63B 21/4037; A63B 21/4047;
(Continued)

(56) References Cited

U.S. PATENT DOCUMENTS 3,345,067 A * 10/1967 Smith .................... A63B 21/04
482/121
4,008,892 A * 2/1977 Nissen ..................... A63K 3/00
482/16
(Continued)

FOREIGN PATENT DOCUMENTS

CN 108854004 A * 11/2018 ............. A63B 69/00
EP 1412031 B1 * 4/2009 ............... A63B 1/00
(Continued)

*Primary Examiner* — Gary D Urbiel Goldner

(57) ABSTRACT

A rehabilitative and corrective system, a strength building system, a recovery system, a muscle activation system, and methods of use are presented. The invention provides a stable platform with multiple equipment attachments, an adjustable set of pillars with a stable crossbar, and a storage compartment. The invention is collapsible for movement and storage. The invention is also adjustable to fit the needs of various individuals and exercises. The systems and methods of use provide for a variety of rehabilitative and human performance movements which provide for a health professionals intent and musculoskeletal needs. The stable platform provides for vertical and horizontal adjustment. A center bar of the invention includes pillar cams and can be adjusted to rotate or remain stable. The invention provides for space savings and can be used to increase joint mobility, muscle activation, release, and strength, and other individual needs and goals.

5 Claims, 39 Drawing Sheets

(52) U.S. Cl.
CPC ................ *A61H 2001/0203* (2013.01); *A61H 2201/0157* (2013.01); *A63B 2210/50* (2013.01); *A63B 2225/093* (2013.01)

(58) Field of Classification Search
CPC .......... A63B 2023/006; A63B 2210/50; A63B 2225/093
See application file for complete search history.

(56) References Cited

U.S. PATENT DOCUMENTS

| | | | | | |
|---|---|---|---|---|---|
| 4,183,695 | A * | 1/1980 | Wilcox | E01F 9/635 | 482/16 |
| 4,696,470 | A * | 9/1987 | Fenner | A63B 1/00 | 482/17 |
| 5,320,591 | A * | 6/1994 | Harmon | A63B 71/0009 | 482/121 |
| 5,389,055 | A * | 2/1995 | Gangloff | A63B 21/4045 | 482/142 |
| 5,405,306 | A * | 4/1995 | Goldsmith | A63B 23/03575 | 482/142 |
| 5,662,556 | A * | 9/1997 | Gangloff | A63B 1/005 | 482/17 |
| 5,810,702 | A * | 9/1998 | Wilkinson | A63B 21/4029 | 482/130 |
| 5,885,197 | A * | 3/1999 | Barton | A63B 22/0087 | 482/145 |
| 5,913,749 | A * | 6/1999 | Harmon | A63B 21/1672 | 482/129 |
| 7,762,936 | B2 * | 7/2010 | Conley | A61H 1/0244 | 482/142 |
| 7,946,971 | B2 * | 5/2011 | Conley | A61H 1/0244 | 482/142 |
| 8,632,444 | B2 * | 1/2014 | McBride | A63B 21/4043 | 482/121 |
| 9,272,174 | B2 * | 3/2016 | Carter | A63B 21/4037 | |
| 9,289,642 | B2 * | 3/2016 | Ho | A63B 21/00069 | |
| 9,295,866 | B2 * | 3/2016 | Kwo | A63B 71/023 | |
| 9,630,055 | B2 * | 4/2017 | Runyan | A63B 21/00047 | |
| 10,987,532 | B2 * | 4/2021 | Lawton | A63B 23/03575 | |
| 11,077,337 | B1 * | 8/2021 | Majkrzak | A63B 23/02 | |
| D958,908 | S * | 7/2022 | Thorpe | D21/686 | |
| D961,025 | S * | 8/2022 | Chen | D21/691 | |
| 11,577,123 | B1 * | 2/2023 | Saffaie | A63B 23/0205 | |
| 2004/0209751 | A1 * | 10/2004 | Thonn, Jr. | A63B 21/4047 | 482/142 |
| 2004/0209752 | A1 * | 10/2004 | Thonn, Jr. | A63B 21/4047 | 482/123 |
| 2005/0059536 | A1 * | 3/2005 | Croft | A63B 21/023 | 482/142 |
| 2005/0130814 | A1 * | 6/2005 | Nitta | A63B 1/00 | 482/121 |
| 2006/0035750 | A1 * | 2/2006 | Weiss | A63B 1/00 | 482/34 |
| 2006/0122044 | A1 * | 6/2006 | Ho | A63B 21/0552 | 482/129 |
| 2006/0199703 | A1 * | 9/2006 | Shifferaw | A63B 23/0458 | 482/52 |
| 2006/0258518 | A1 * | 11/2006 | Kessler | A63B 23/0355 | 482/112 |
| 2009/0111660 | A1 * | 4/2009 | Snow | A63B 21/0552 | 482/146 |
| 2012/0322622 | A1 * | 12/2012 | Davis | A63B 21/00047 | 482/38 |
| 2013/0225378 | A1 * | 8/2013 | Burek | A63B 26/00 | 482/142 |
| 2014/0194266 | A1 * | 7/2014 | Raiten | A63B 21/4037 | 482/142 |
| 2016/0136472 | A1 * | 5/2016 | Kwo | A63B 17/04 | 482/38 |
| 2019/0262648 | A1 * | 8/2019 | Swanson | A63B 5/10 | |
| 2019/0314667 | A1 * | 10/2019 | Smith | A63B 21/4033 | |
| 2020/0101342 | A1 * | 4/2020 | Lawton | A63B 21/4033 | |

FOREIGN PATENT DOCUMENTS

| | | | | |
|---|---|---|---|---|
| GB | 2497278 A | * | 6/2013 | A61H 1/0222 |
| GB | 2511321 A | * | 9/2014 | A63B 22/0605 |
| TW | 200301147 A | * | 7/2003 | A63B 67/04 |

* cited by examiner

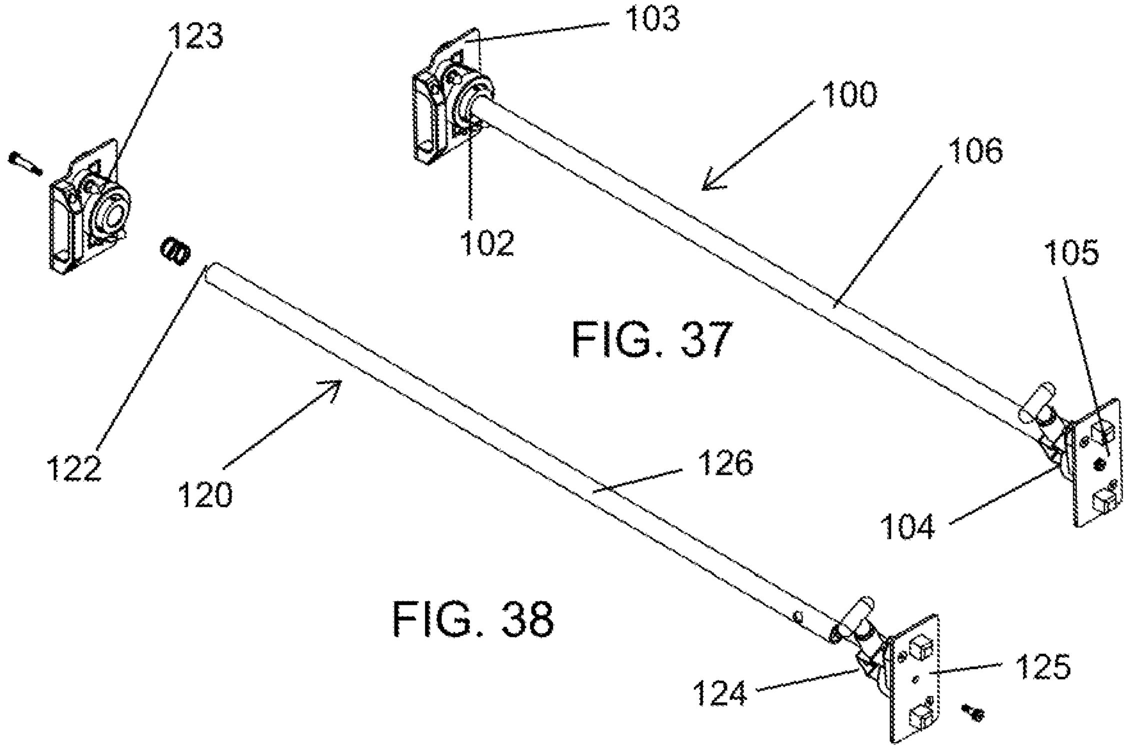
FIG. 37
FIG. 38
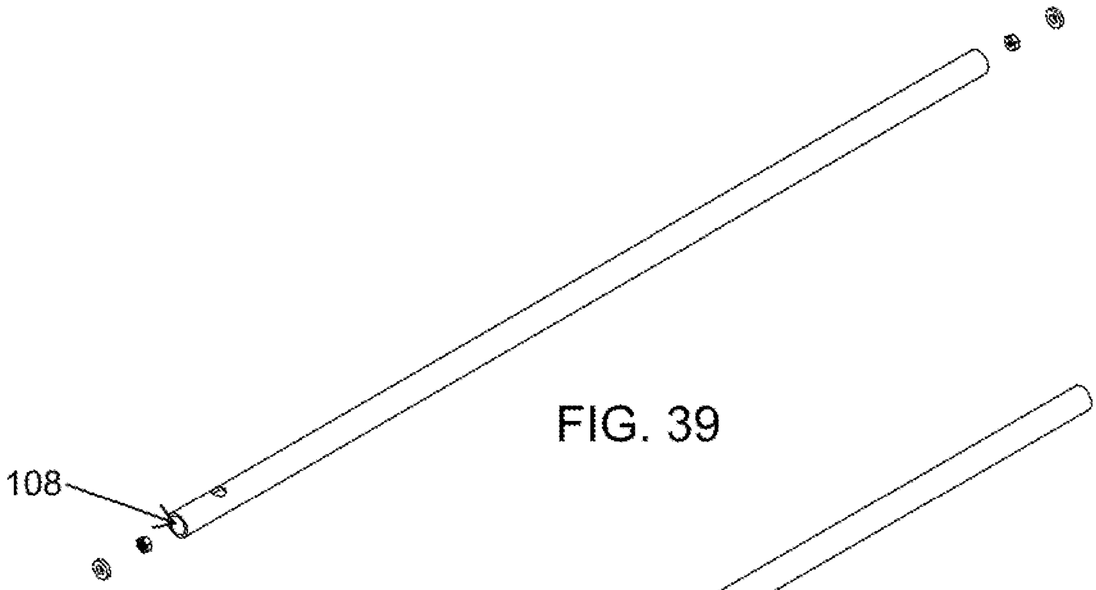
FIG. 39
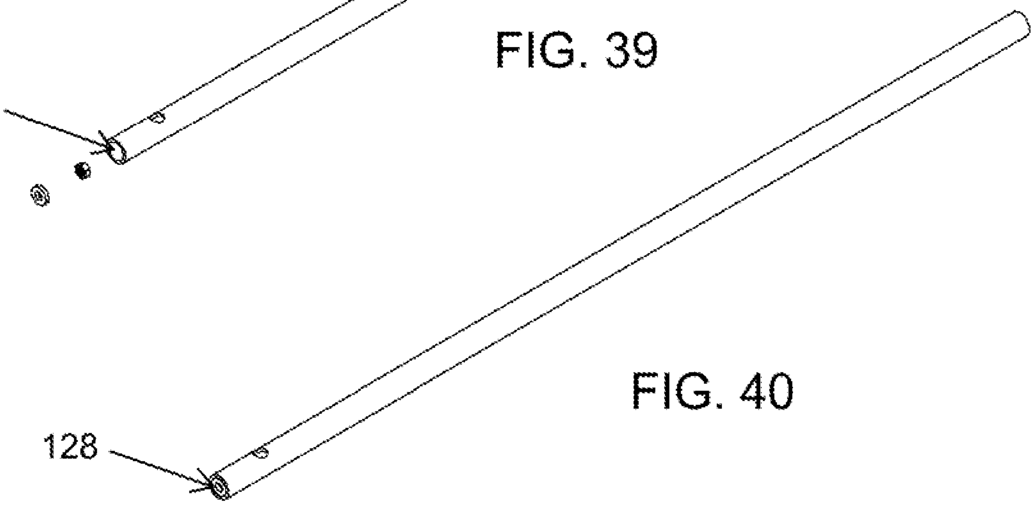
FIG. 40

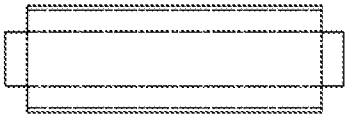
FIG. 98
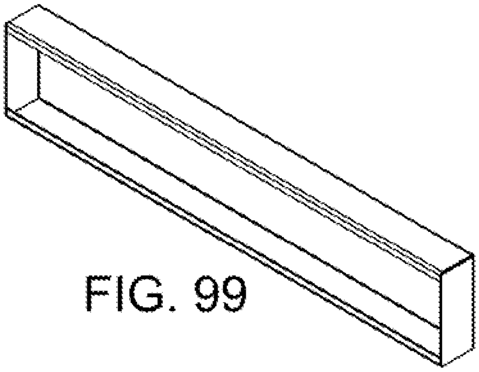
FIG. 99
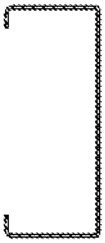
FIG. 100
FIG. 101
FIG. 102
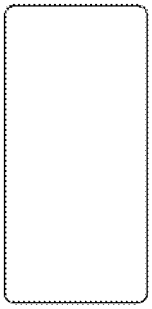
FIG. 103
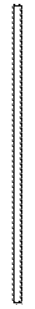
FIG. 104
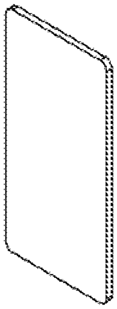
FIG. 105
FIG. 106
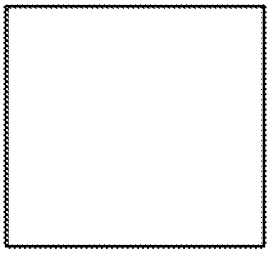
FIG. 107
FIG. 108
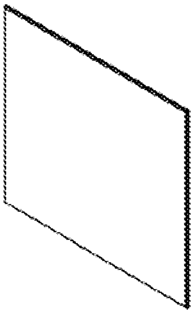
FIG. 109

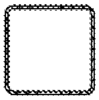
FIG. 110
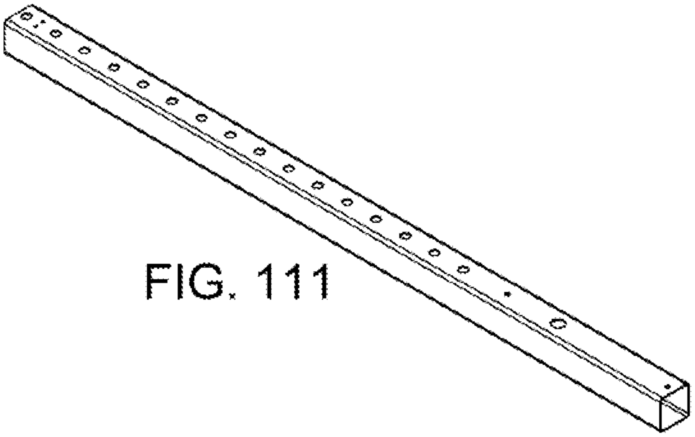
FIG. 111
FIG. 112
FIG. 113
FIG. 114
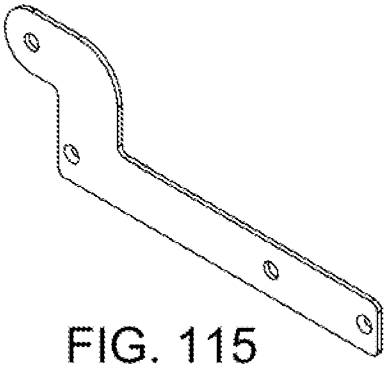
FIG. 115
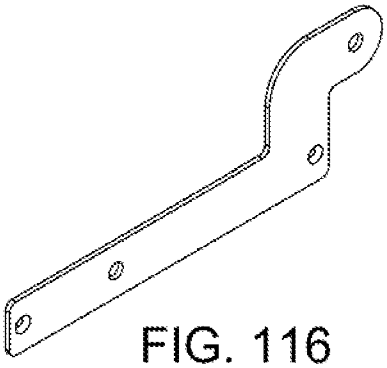
FIG. 116
FIG. 117
FIG. 118
FIG. 119
FIG. 120
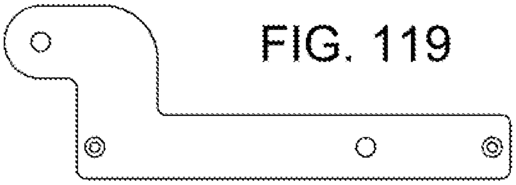
FIG. 121
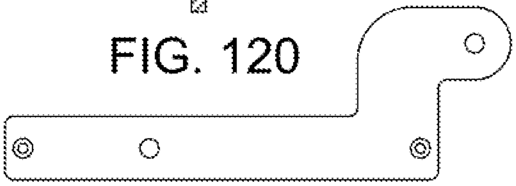
FIG. 122

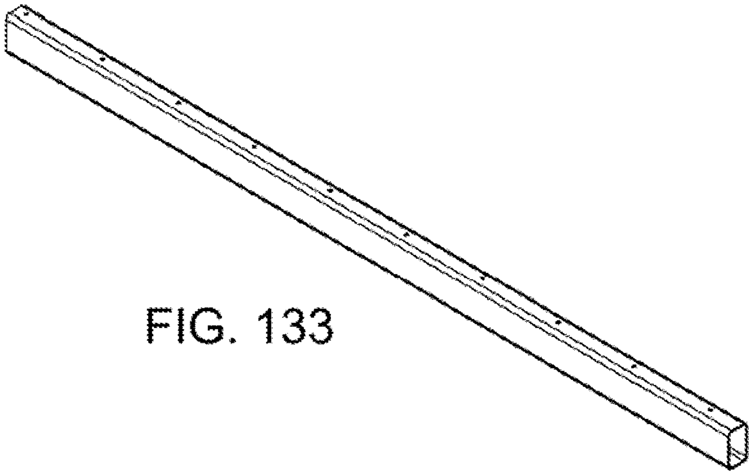
FIG. 133
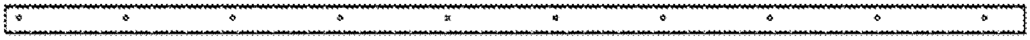
FIG. 134
FIG. 135
FIG. 137
FIG. 136
FIG. 138
FIG. 139
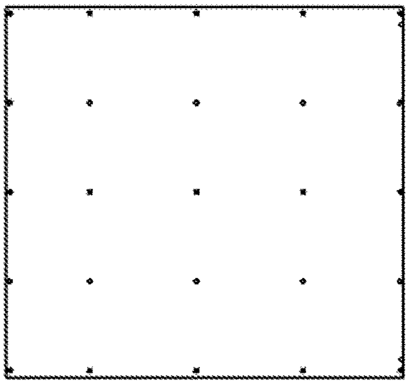
FIG. 140
FIG. 141
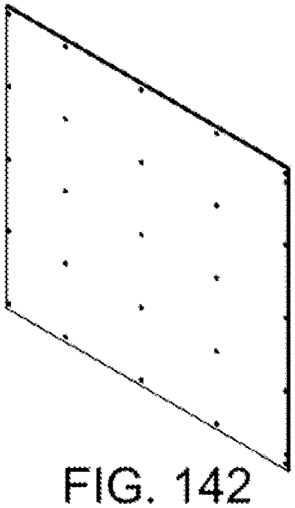
FIG. 142

FIG. 143
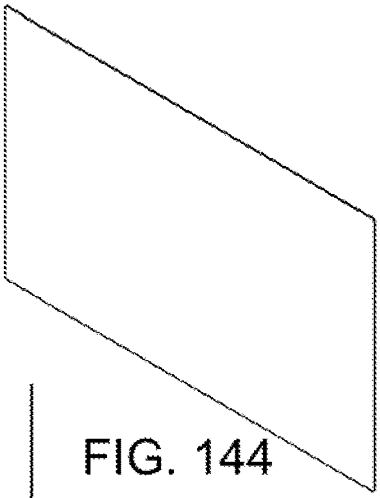
FIG. 144
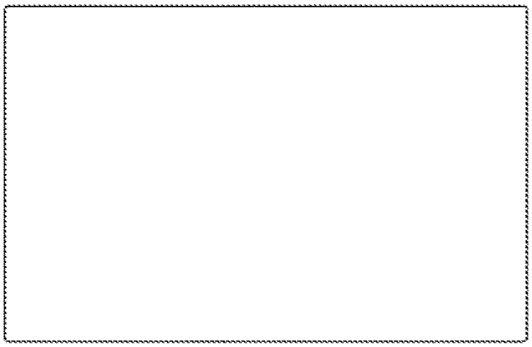
FIG. 145
FIG. 146
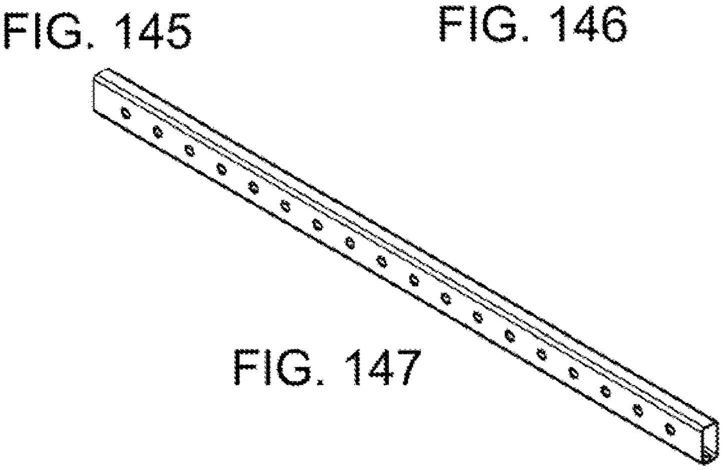
FIG. 147
FIG. 148
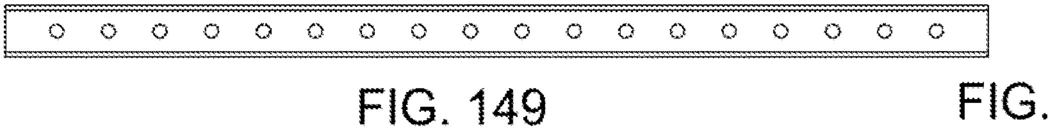
FIG. 149
FIG. 151
FIG. 150

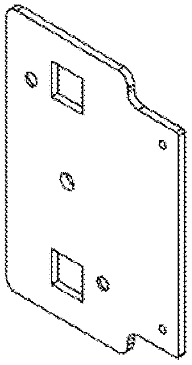
FIG. 198
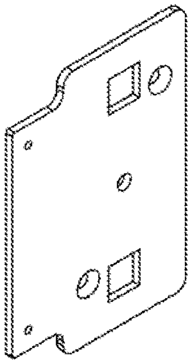
FIG. 202
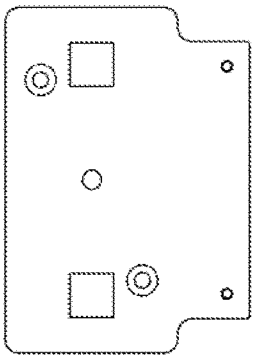
FIG. 199
FIG. 200
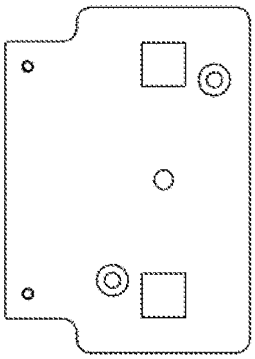
FIG. 201
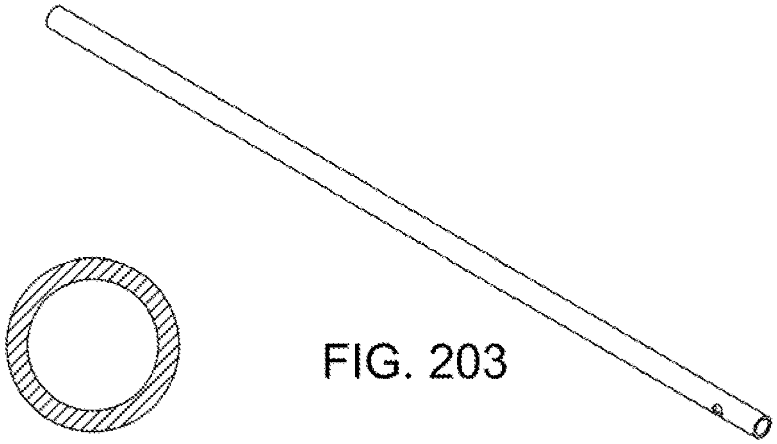
FIG. 203
FIG. 204
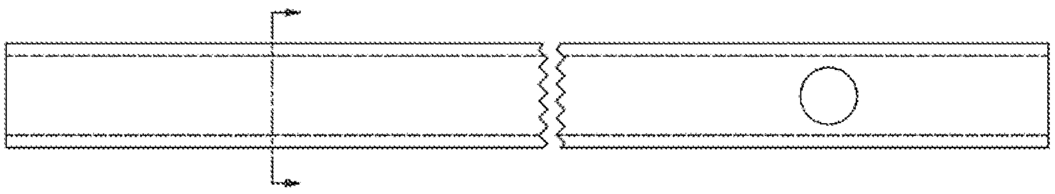
FIG. 205

REHABILITATIVE AND CORRECTIVE SYSTEM, STRENGTH SYSTEM, RECOVERY SYSTEM, MUSCLE ACTIVATION SYSTEM, AND METHODS OF USE

CROSS-REFERENCE TO RELATED APPLICATIONS

The present application claims priority to the U.S. Provisional Patent Application No. 63/276,735 which was filed on Nov. 8, 2021, which is hereby incorporated by reference herein in its entirety, including any figures, tables, or drawings.

FIELD OF THE DISCLOSURE

This disclosure relates to a rehabilitative and corrective system, a strength building system, a recovery system, a muscle activation system, and methods of use. More specifically, and without limitation, the present disclosure relates to an adjustable rehabilitative and corrective platform and corresponding apparatuses that provide equipment to help a user build strength, recover, activate muscles, and release.

COPYRIGHT NOTICE

At least a portion of the disclosure of this patent document contains material that is subject to copyright protection. The copyright owner has no objection to the facsimile reproduction by anyone of the patent document or the patent disclosure, as it appears in the Patent and Trademark Office patent files and/or records, but otherwise reserves all copyright rights whatsoever. The following notice applies to the software and data as described below and in the drawings that form a part of this document. Copyright Jason Mitchler and Tyler Christiansen. All rights reserved.

BACKGROUND OF THE DISCLOSURE

Physical rehabilitation is a practice which is well known in the art. Physical rehabilitation, also associated with medicine and sports medicine, often involves care, treatment, and/or exercises and/or motions which help a person and/or patient improve physical abilities and/or recover lost physical abilities that may improve daily life. Some of the physical abilities may be lost because of injury, trauma, disease, aging, or otherwise. Physical rehabilitation is a process, often a medical prognosis, of helping a patient and/or individual improve function and quality of life.

Physical rehabilitation may involve doctors, chiropractors, physical therapists, and various types of equipment. A number of rehabilitative and human performance professionals and various types of equipment exist in the state of the art. A large variety of equipment exists for increasing mobility, alignment, strength, and improving recovery and/or improving recovery times for individuals.

When utilized correctly, various equipment in the state of the art can be effective in assisting improvement of mobility and strength for an individual. Similarly, this equipment, along with proper guidance, can also be effective in assisting with muscle activation and release. In this way, there exists equipment which can assist with rehabilitation and performance of individuals.

However, the current state of the art requires many pieces of equipment. Oftentimes, rehabilitation involves a huge facility to accommodate the various types of equipment and space required for such equipment. This is how the industry has operated for a long time; the rehabilitative industry. Oftentimes various pieces of equipment are required for a single type of move or guided rehabilitation.

Complicating matters further, the bulk of some types of equipment often doesn't fit appropriately in a required space and/or fits awkwardly into a required space. Furthermore, some equipment and/or exercises are performed on an unstable surface and/or in a circumstance of high risk and/or in a circumstance where safety may be an issue. These types of problems have plagued clinics and performance facilities. This has become known as common practice and fitting as much equipment as possible into a space is industry standard.

Thus, there is a need in the art for a single, well-defined spatial system which provides rehabilitation. Furthermore, while the industry practice is to utilize more equipment, there is a need in the art for a system which provides mobility enhancement, alignment, strength, recovery tools and functions in a compact and easily accessible system. These and other needs, such as accessibility and safety are needed. This need would allow for smaller offices and/or spaces. Said another way, this system would allow for use in more spaces, such as homes, or the like. In this way, the various functionality of the disclosure herein, provides for a plurality of different functions and services as an all-in-one system, utilizing a minimal amount of space, while providing rehabilitative and performance professionals a more than adequate, functional workspace to utilize skills and provide rehabilitation and more in a safe environment.

Furthermore, the present disclosure provides for meeting musculoskeletal needs of various individuals of various shapes and sizes, while also providing a plurality of storage locations for accessories and equipment. Furthermore, the present system can be stored easily, saving space and/or providing additional space when not in use. Similarly, the present disclosure also provides portability so that the system may be easily moved from one location to another.

The disclosure herein provides these advantages and others, solves long-felt needs in the art, goes against the art practice of additional and numerous amounts of equipment, and provides other functionality, features, and advantages, as will become clear from the specification and claims provided.

SUMMARY OF THE DISCLOSURE

The present disclosure—the rehabilitative and corrective system, a strength building system, a recovery system, a muscle activation system, and methods of use—provides the state of the art with an adjustable rehabilitative and corrective platform and corresponding apparatuses that provide equipment to help a user build strength, recover, activate muscles, and release. The rehabilitative and corrective system provides for an all-in-one system which archives the functionality of many different pieces of equipment that would otherwise be required for rehabilitation practices, among other practices.

Said another way, the present disclosure provides the state of the art with various advantages over the existing state of the art. The rehabilitation and corrective system fills various needs, long-felt in the art, by providing a stable system, safe to use, with multiple attachments, an adjustable set of pillars with a stable rotating crossbar, storage compartments, and various other rehabilitative equipment for use in rehabilitation which can be customized to the needs and/or requirements of an individual.

The present disclosure provides the state of the art with an activation and release platform. Furthermore, the present disclosure advantageously fills deficiencies in the state of the art by providing a stable platform with multiple equipment attachments and storage—in a way which eliminates the need for numerous pieces of equipment in a work space. Furthermore, the present disclosure provides the state of the art with a stable rotating crossbar and other moveable pieces for operation and/or use. Furthermore, the present disclosure provides the state of the art with a storage compartment for various components such as dowels and other rehabilitative equipment and the like; to be utilized based on an individual's needs.

Thus, it is a primary object of the disclosure to provide a rehabilitative and corrective system, a strength building system, a recovery system, a muscle activation system, and methods of use that improves upon the state of the art.

Another object of the disclosure is to provide a rehabilitative and corrective system, a strength building system, a recovery system, a muscle activation system, and methods of use that includes a frame.

Yet another object of the disclosure is to provide a rehabilitative and corrective system, a strength building system, a recovery system, a muscle activation system, and methods of use that includes a platform.

Another object of the disclosure is to provide a rehabilitative and corrective system, a strength building system, a recovery system, a muscle activation system, and methods of use that includes a stable platform that improves the safety of a user.

Yet another object of the disclosure is to provide a rehabilitative and corrective system, a strength building system, a recovery system, a muscle activation system, and methods of use that can be folded for storage and/or portability.

Another object of the disclosure is to provide a rehabilitative and corrective system, a strength building system, a recovery system, a muscle activation system, and methods of use that includes storage compartments for components.

Yet another object of the disclosure is to provide a rehabilitative and corrective system, a strength building system, a recovery system, a muscle activation system, and methods of use that can be opened and closed.

Another object of the disclosure is to provide a rehabilitative and corrective system, a strength building system, a recovery system, a muscle activation system, and methods of use that provide various attachments for additional functionality.

Yet another object of the disclosure is to provide a rehabilitative and corrective system, a strength building system, a recovery system, a muscle activation system, and methods of use that provides for the ability to adjust various components for various sizes of a user and/or number of users.

Another object of the disclosure is to provide a rehabilitative and corrective system, a strength building system, a recovery system, a muscle activation system, and methods of use that can be locked into various positions for safety.

Yet another object of the disclosure is to provide a rehabilitative and corrective system, a strength building system, a recovery system, a muscle activation system, and methods of use that provides for platform material to be interchangeable.

Another object of the disclosure is to provide a rehabilitative and corrective system, a strength building system, a recovery system, a muscle activation system, and methods of use that can be configured to various users for various exercises and/or activations.

Yet another object of the disclosure is to provide a rehabilitative and corrective system, a strength building system, a recovery system, a muscle activation system, and methods of use that are collapsible.

Another object of the disclosure is to provide a rehabilitative and corrective system, a strength building system, a recovery system, a muscle activation system, and methods of use that saves space for a user.

Yet another object of the disclosure is to provide a rehabilitative and corrective system, a strength building system, a recovery system, a muscle activation system, and methods of use that provides for configuration adjustments to modify exercises.

Another object of the disclosure is to provide a rehabilitative and corrective system, a strength building system, a recovery system, a muscle activation system, and methods of use that can be easily stored.

Yet another object of the disclosure is to provide a rehabilitative and corrective system, a strength building system, a recovery system, a muscle activation system, and methods of use that provides for storage of accessory equipment.

Another object of the disclosure is to provide a rehabilitative and corrective system, a strength building system, a recovery system, a muscle activation system, and methods of use that provides a storage compartment for accessory equipment.

Yet another object of the disclosure is to provide a rehabilitative and corrective system, a strength building system, a recovery system, a muscle activation system, and methods of use that provides a storage compartment for platform equipment.

Another object of the disclosure is to provide a rehabilitative and corrective system, a strength building system, a recovery system, a muscle activation system, and methods of use that provides a stable platform during exercise.

Yet another object of the disclosure is to provide a rehabilitative and corrective system, a strength building system, a recovery system, a muscle activation system, and methods of use that provides for the ability to attach multiple pieces of equipment to a single piece of equipment.

Another object of the disclosure is to provide a rehabilitative and corrective system, a strength building system, a recovery system, a muscle activation system, and methods of use that provide adjustable pillars and adjustable crossbars.

Yet another object of the disclosure is to provide a rehabilitative and corrective system, a strength building system, a recovery system, a muscle activation system, and methods of use that saves facility and/or clinic space.

Another object of the disclosure is to provide a rehabilitative and corrective system, a strength building system, a recovery system, a muscle activation system, and methods of use that benefits a patient based on individual musculoskeletal needs.

Yet another object of the disclosure is to provide a rehabilitative and corrective system, a strength building system, a recovery system, a muscle activation system, and methods of use that provides new solutions for a user in exercise position and musculoskeletal needs.

Another object of the disclosure is to provide a rehabilitative and corrective system, a strength building system, a recovery system, a muscle activation system, and methods of use that are easy to use.

Yet another object of the disclosure is to provide a rehabilitative and corrective system, a strength building system, a recovery system, a muscle activation system, and methods of use that are safe to use.

Another object of the disclosure is to provide a rehabilitative and corrective system, a strength building system, a recovery system, a muscle activation system, and methods of use that are stable and accurate.

Yet another object of the disclosure is to provide a rehabilitative and corrective system, a strength building system, a recovery system, a muscle activation system, and methods of use that provide a variety of restrictions in movement.

Another object of the disclosure is to provide a rehabilitative and corrective system, a strength building system, a recovery system, a muscle activation system, and methods of use that are relatively affordable.

Yet another object of the disclosure is to provide a rehabilitative and corrective system, a strength building system, a recovery system, a muscle activation system, and methods of use that are robust.

Another object of the disclosure is to provide a rehabilitative and corrective system, a strength building system, a recovery system, a muscle activation system, and methods of use that are quick and efficient to adjust.

Yet another object of the disclosure is to provide a rehabilitative and corrective system, a strength building system, a recovery system, a muscle activation system, and methods of use that are high quality.

These and other objects, features, or advantages of the present disclosure will become apparent from the specification and claims.

BRIEF DESCRIPTION OF THE DRAWINGS

FIG. 37 is a top, perspective view showing a crossbar.

FIG. 38 is a top, perspective view showing a crossbar.

FIG. 39 is a top, perspective view showing a crossbar.

FIG. 40 is a top, perspective view showing a crossbar.

FIG. 98 is a view showing a support feature.

FIG. 99 is a view showing a support feature.

FIG. 100 is a view showing a support feature.

FIG. 101 is a view showing a support feature.

FIG. 102 is a view showing a support feature.

FIG. 103 is a view showing a support feature.

FIG. 104 is a view showing a support feature.

FIG. 105 is a view showing a support feature.

FIG. 106 is a view showing a support feature.

FIG. 107 is a view showing a support feature.

FIG. 108 is a view showing a support feature.

FIG. 109 is a view showing a support feature.

FIG. 110 is a view showing a support feature.

FIG. 111 is a view showing a support feature.

FIG. 112 is a view showing a support feature.

FIG. 113 is a view showing a support feature.

FIG. 114 is a view showing a support feature.

FIG. 115 is a view showing an attachment feature.

FIG. 116 is a view showing an attachment feature.

FIG. 117 is a view showing an attachment feature.

FIG. 118 is a view showing an attachment feature.

FIG. 119 is a view showing an attachment feature.

FIG. 120 is a view showing an attachment feature.

FIG. 121 is a view showing an attachment feature.

FIG. 122 is a view showing an attachment feature.

FIG. 123 is a view showing a support feature.

FIG. 124 is a view showing a support feature.

FIG. 125 is a view showing a support feature.

FIG. 126 is a view showing a support feature.

FIG. 127 is a view showing a support feature.

FIG. 128 is a view showing a support feature.

FIG. 129 is a view showing a support feature.

FIG. 130 is a view showing a support feature.

FIG. 131 is a view showing a support feature.

Figure 1:
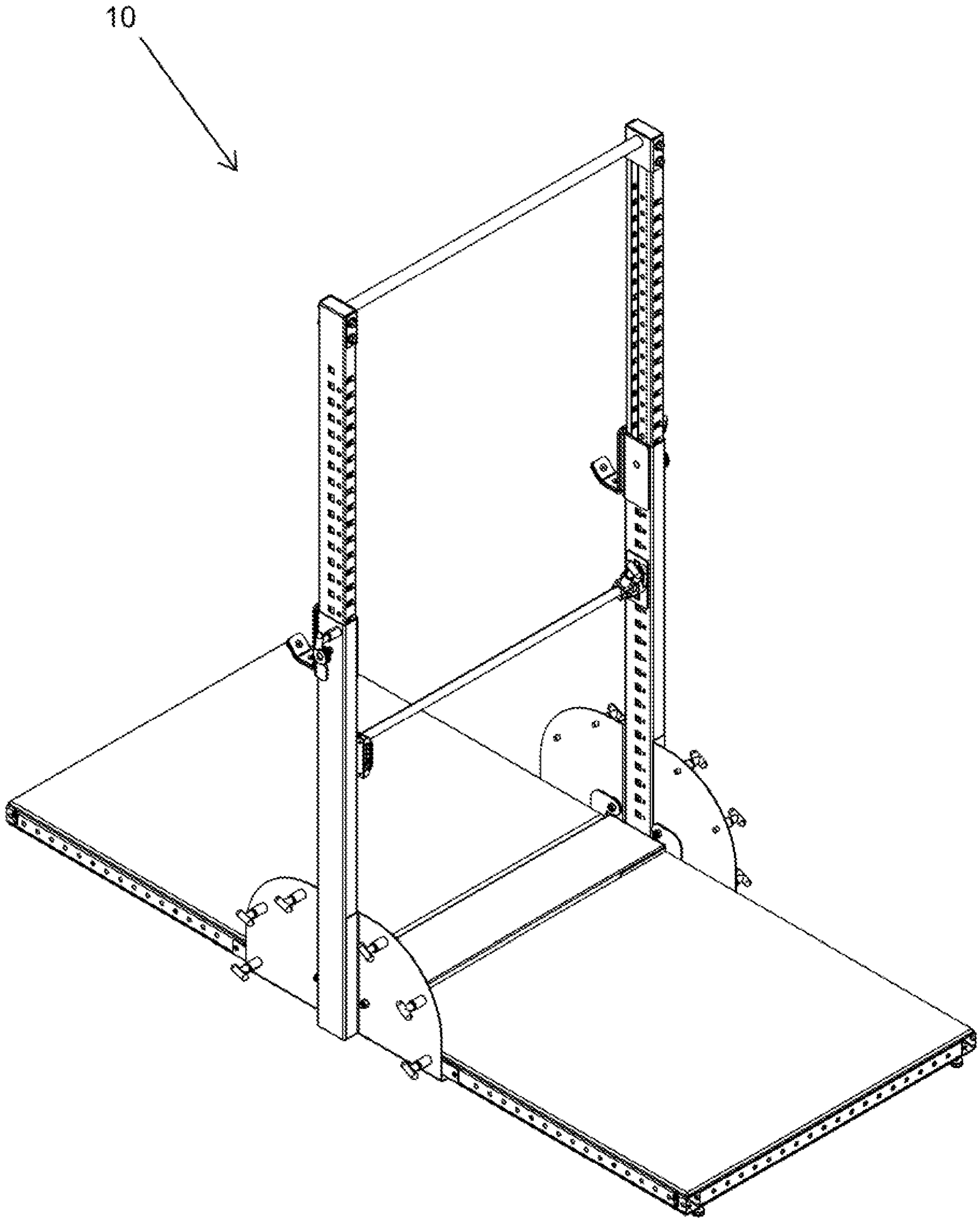
FIG. 1 is a top, perspective view; the view showing the rehabilitative system; the view showing a platform frame; the view showing a stable top platform; the view showing a first center pillar; the view showing a second center pillar; the view showing a first crossbar; the view showing a second crossbar.
Figure 2:
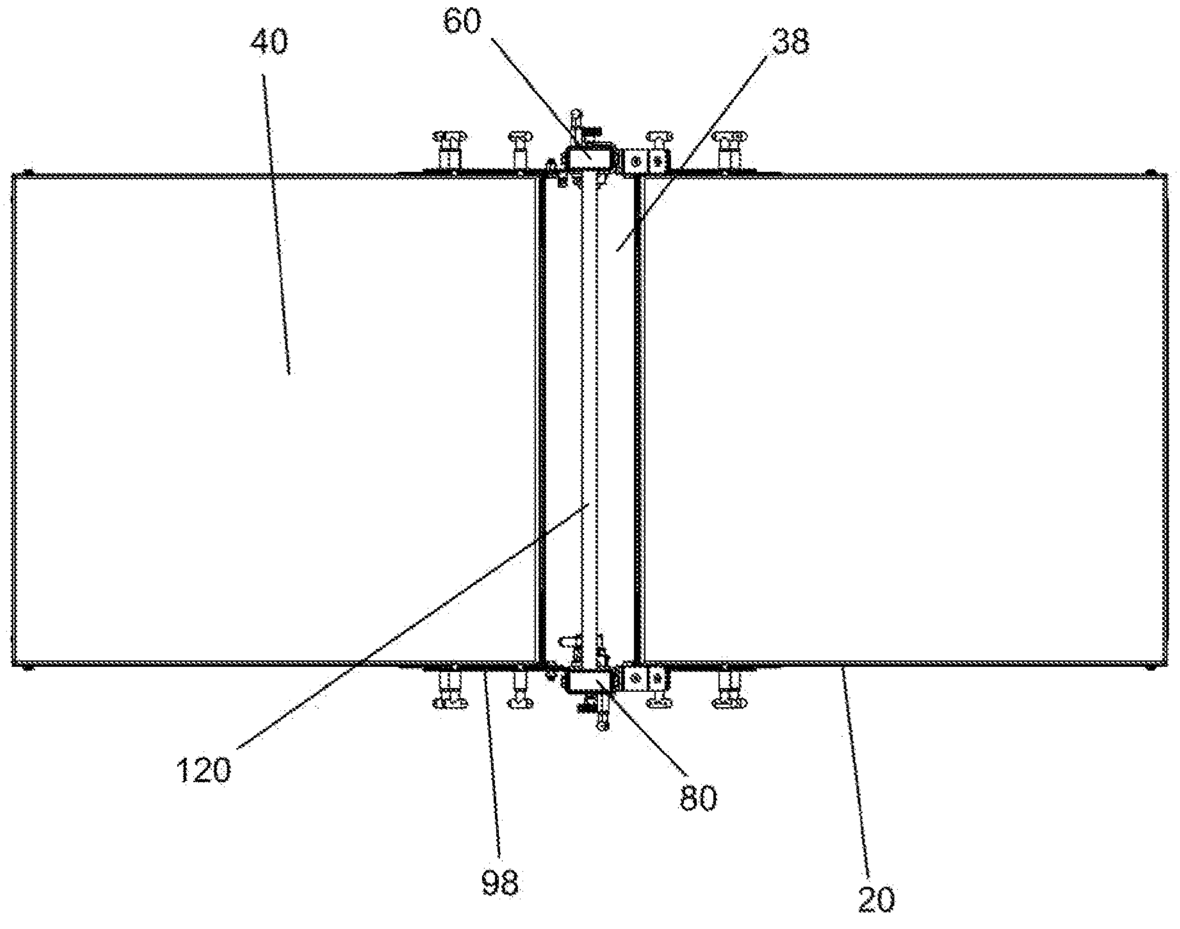
FIG. 2 is a top view; the view showing the rehabilitative system; the view showing a platform frame; the view showing a stable top platform; the view showing a first center pillar; the view showing a second center pillar; the view showing a second crossbar.
Figure 3:
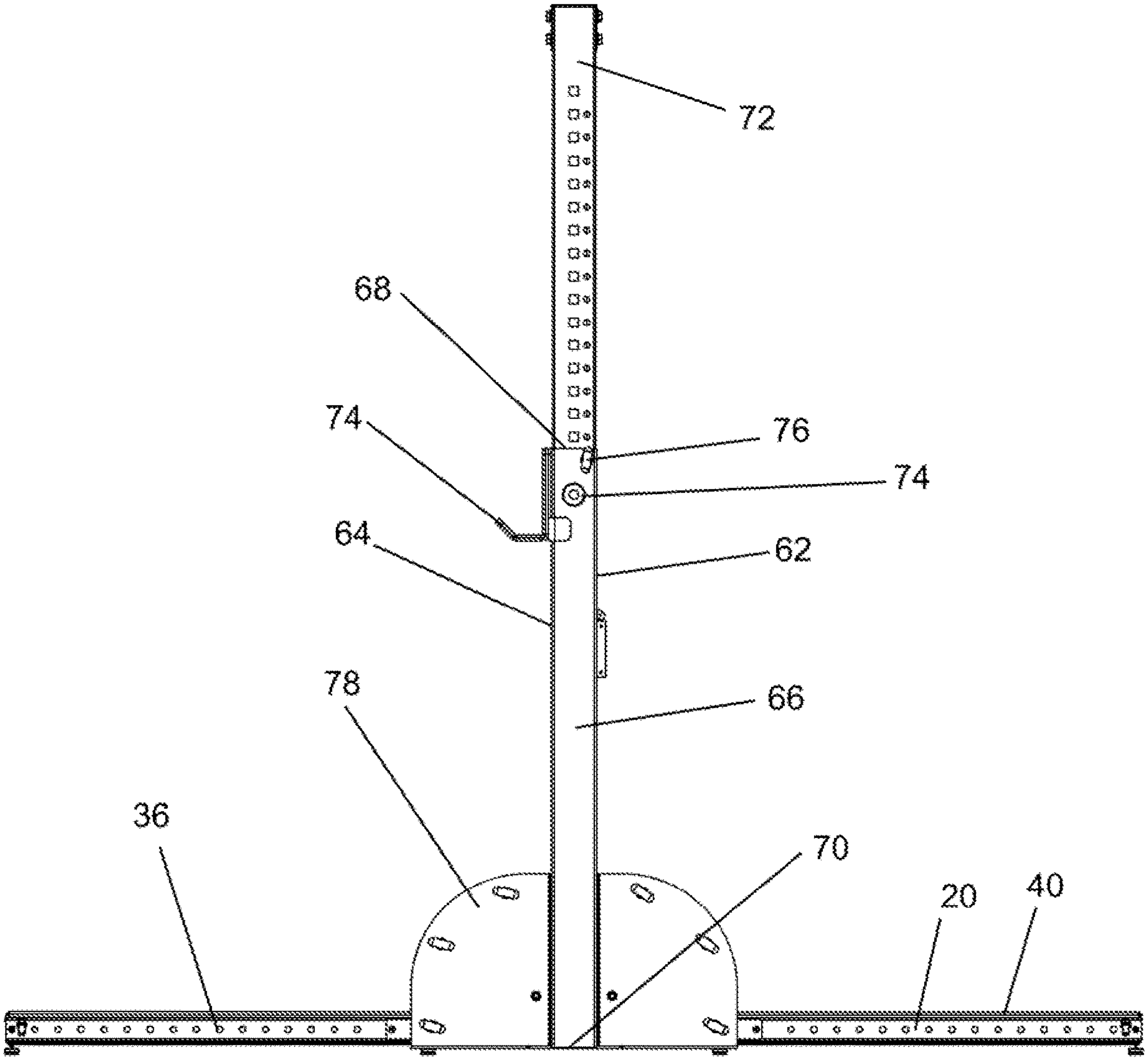
FIG. 3 is a side view; the view showing the rehabilitative system; the view showing a platform frame; the view showing a stable top platform; the view showing a first center pillar; the view showing a plurality of angle support features.
Figure 4:
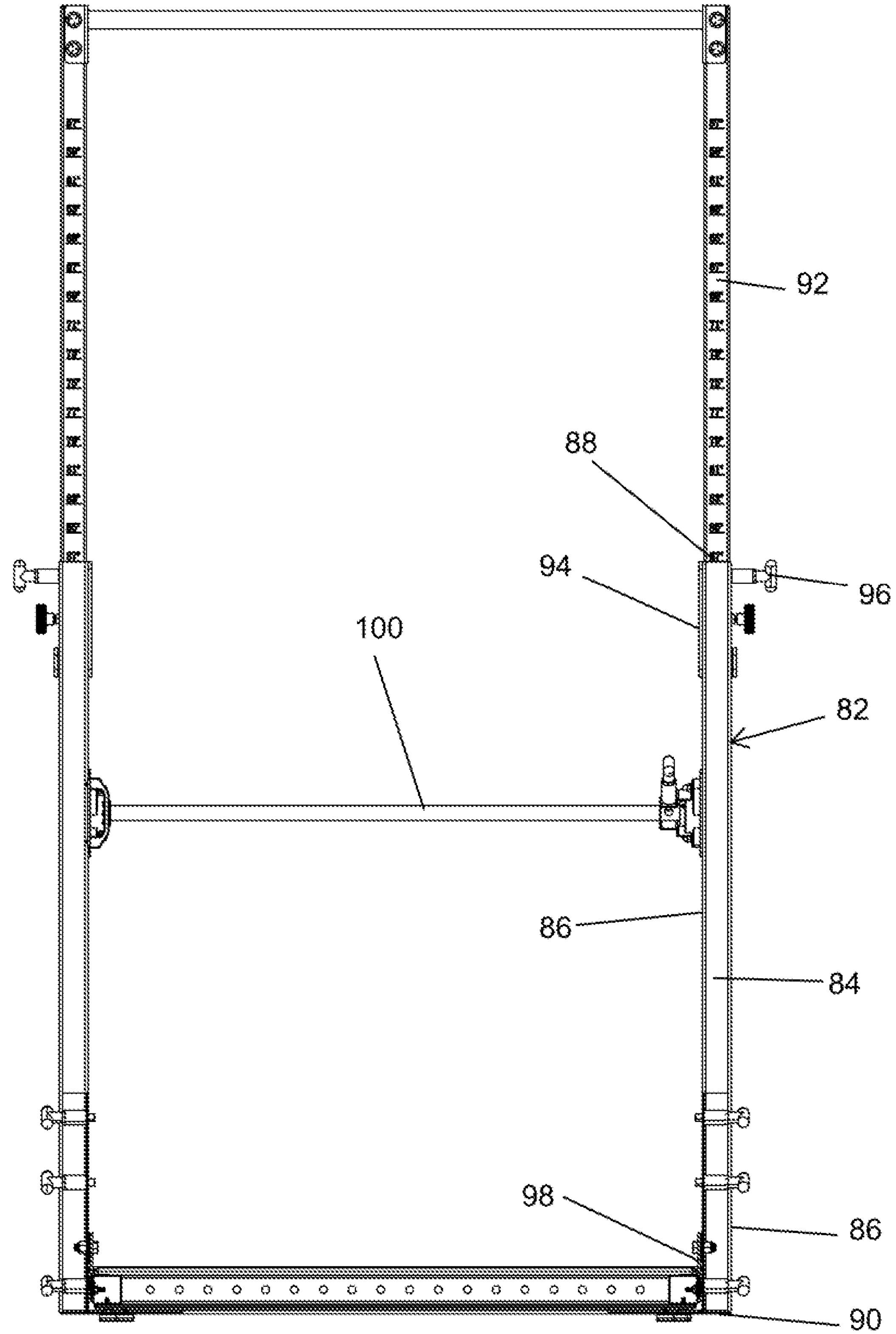
FIG. 4 is a front view; the view showing the rehabilitative system; the view showing a platform frame; the view showing a stable top platform; the view showing a first center pillar; the view showing a second center pillar; the view showing a first crossbar; the view showing a second crossbar.
Figure 5:
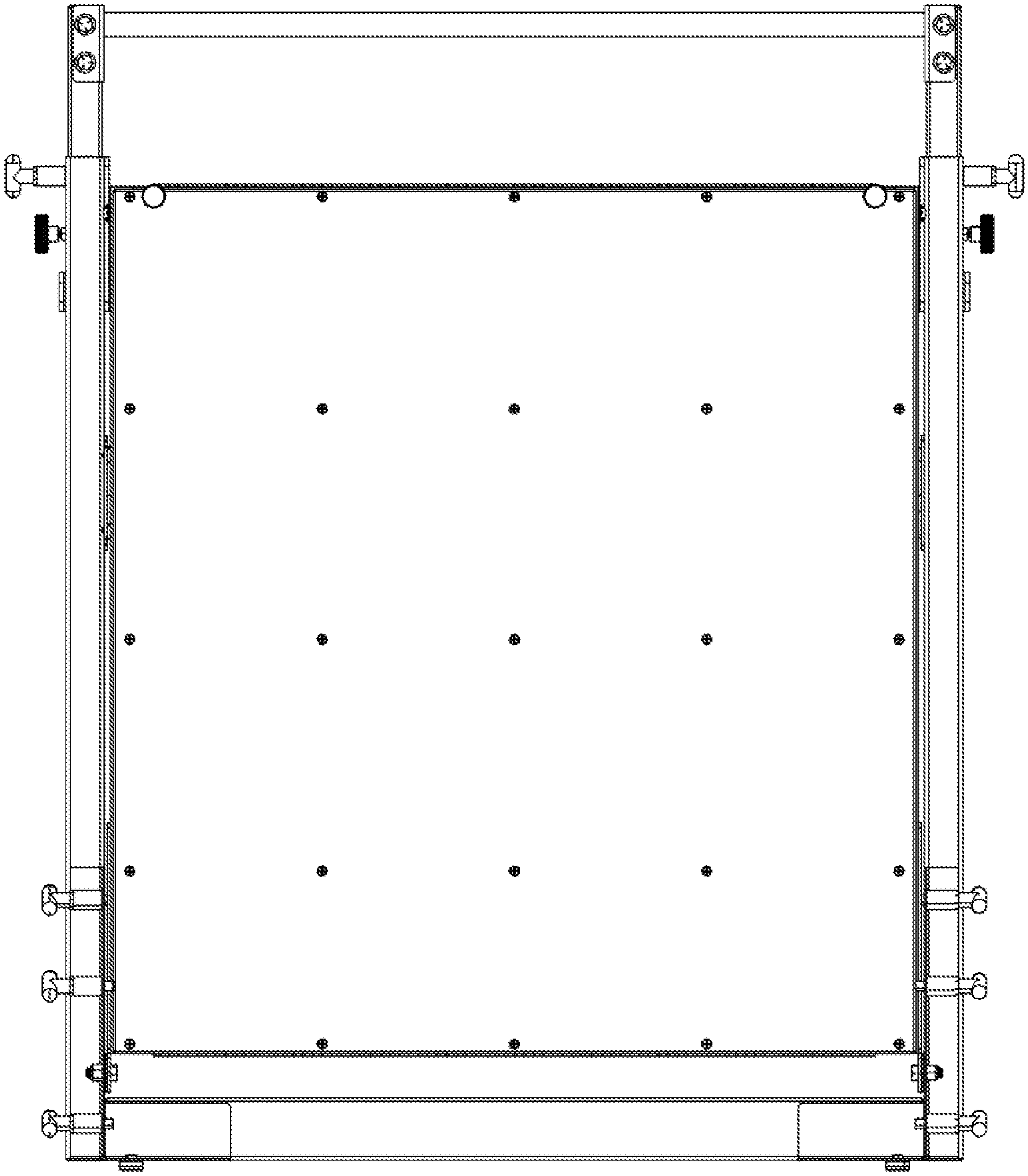
FIG. 5 is a front view of the rehabilitative platform; the view showing the system in the stored position.
Figure 6:
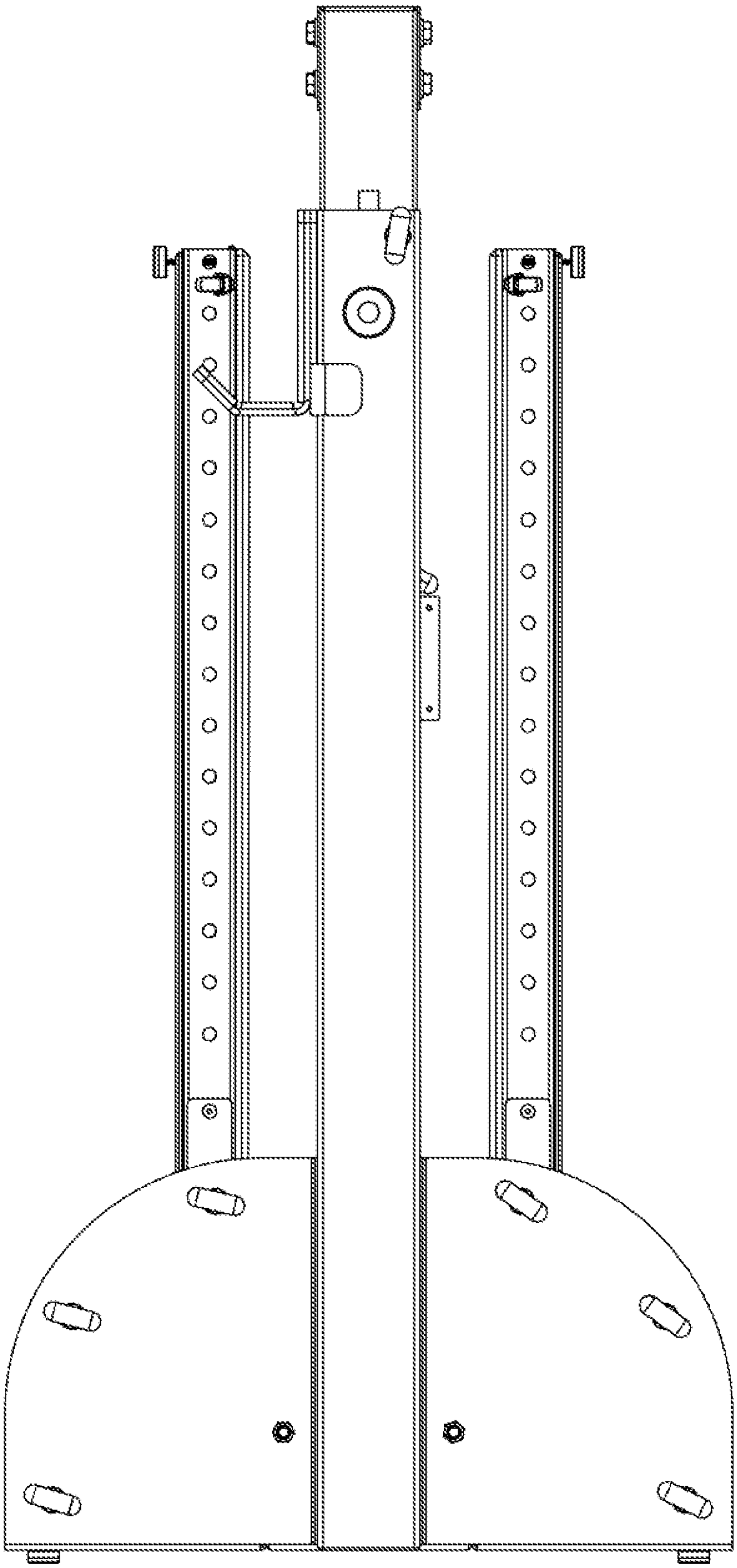
FIG. 6 is a side view of the rehabilitative platform; the view showing the system in the stored position.
Figure 7:
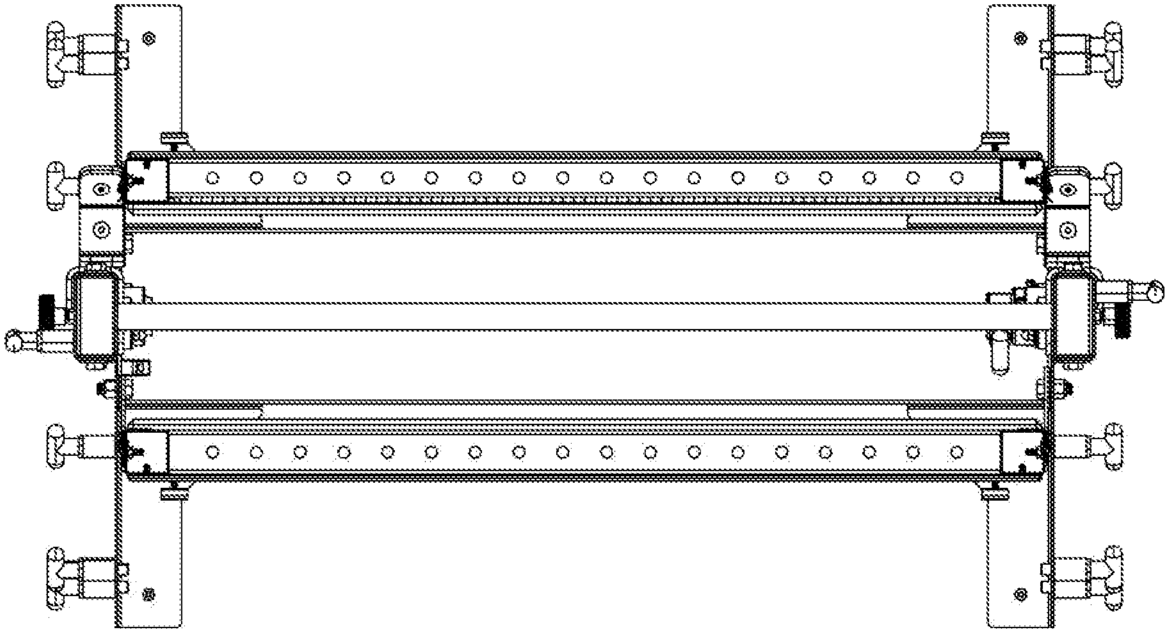
FIG. 7 is a top view of the rehabilitative platform; the view showing the system in the stored position.
Figure 8:
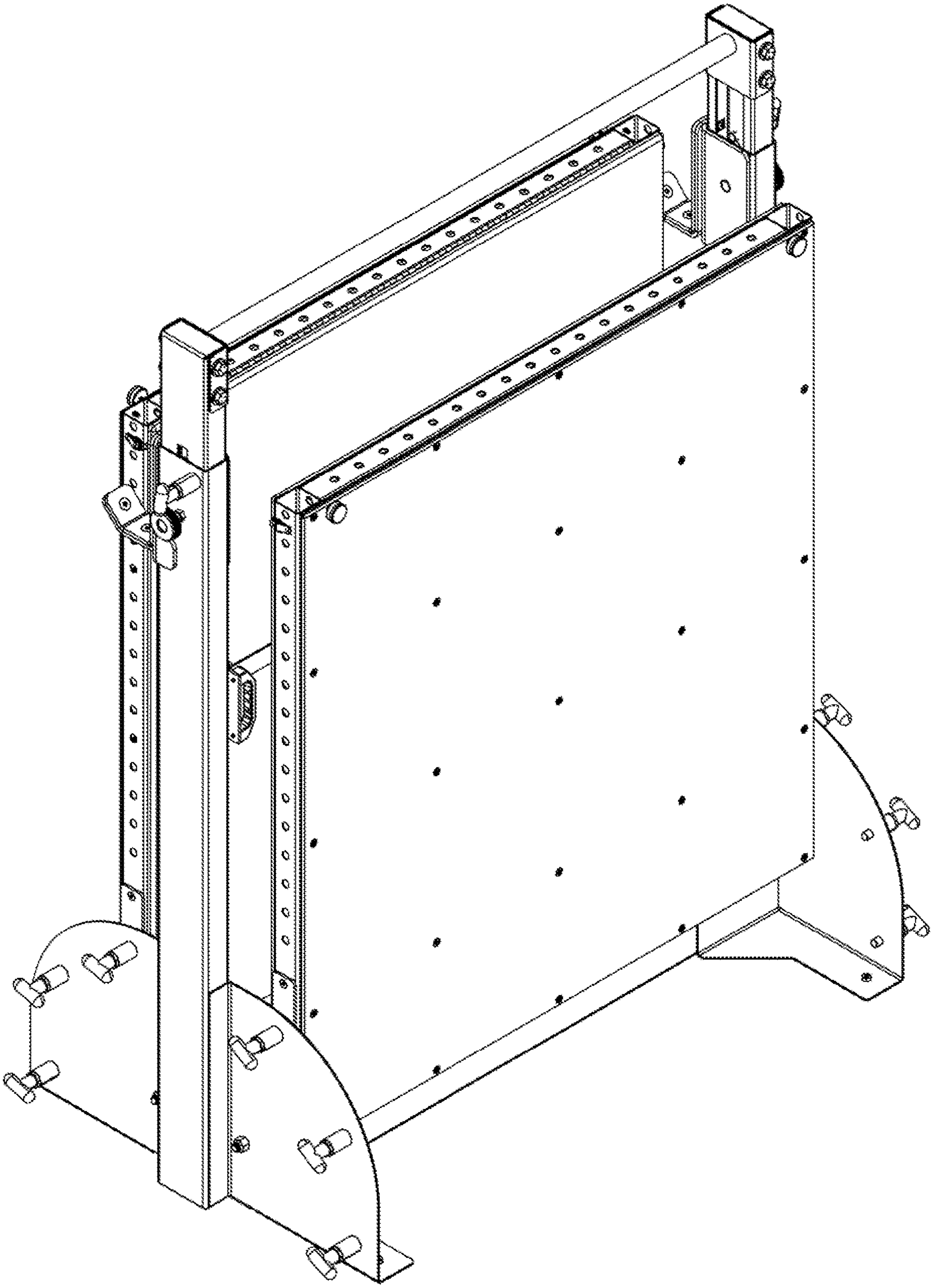
FIG. 8 is a top, perspective view of the rehabilitative platform; the view showing the system in the stored position.
Figure 9:
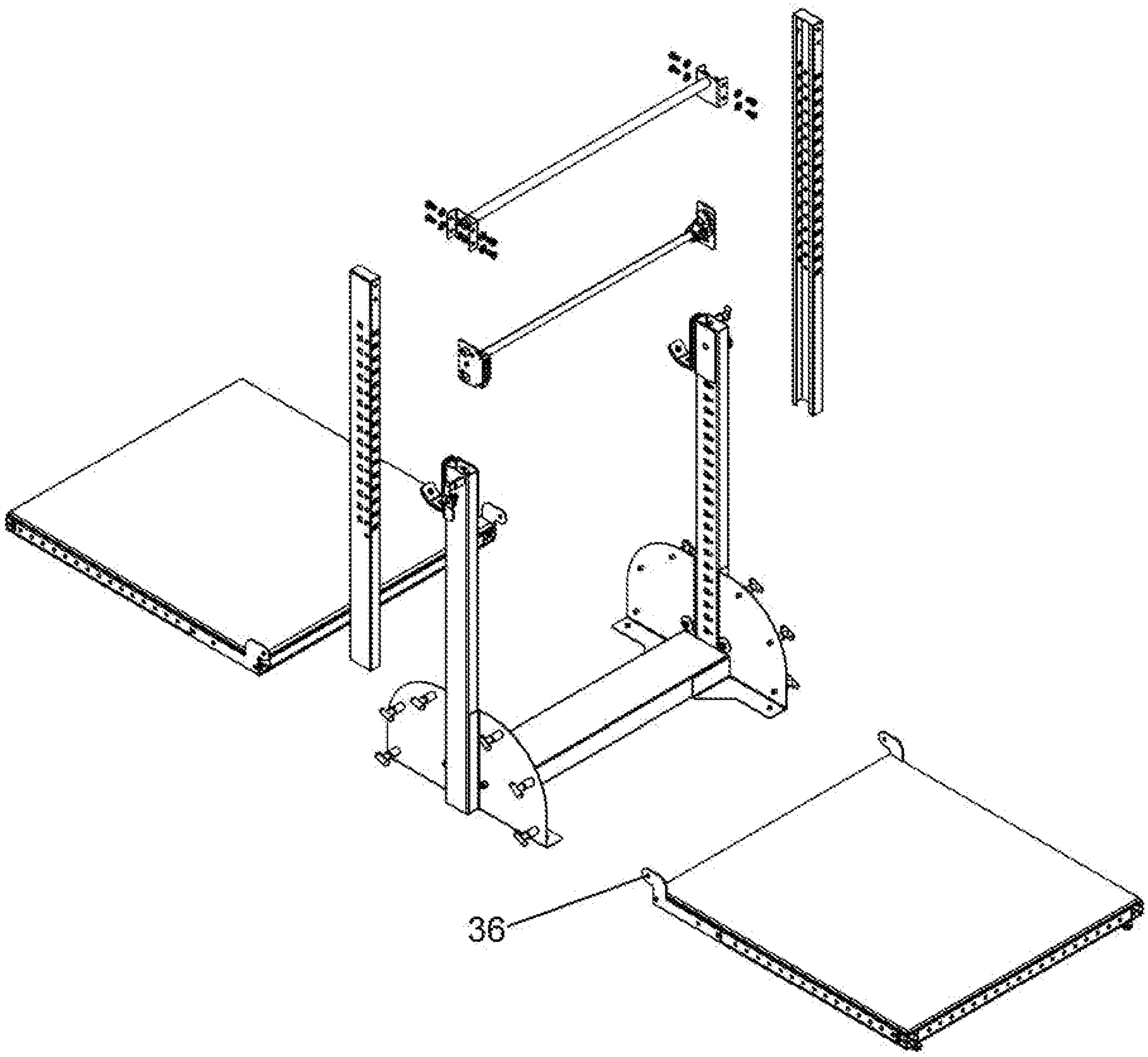
FIG. 9 is a top perspective, exploded view of the rehabilitative platform; the view showing the system in the stored position.
Figure 10:
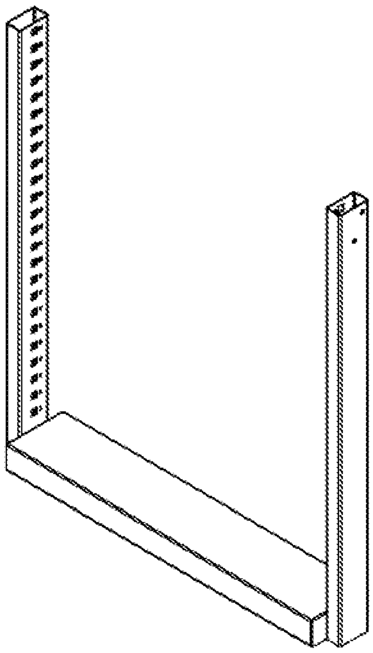
FIG. 10 is a top, perspective view showing the threshold; the view showing the first center pillar; the view showing the second center pillar.
Figure 11:
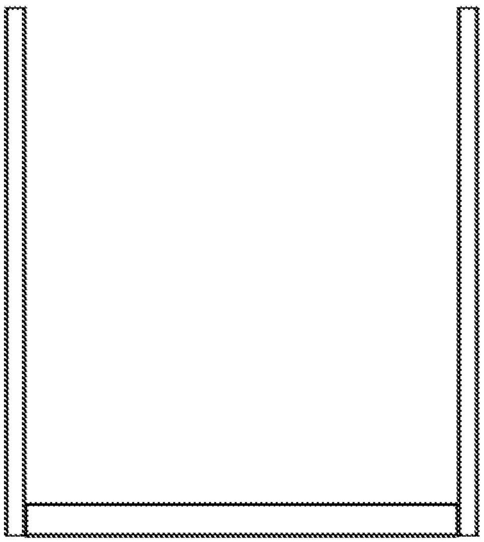
FIG. 11 is a front view showing the threshold; the view showing the first center pillar; the view showing the second center pillar.
Figure 12:
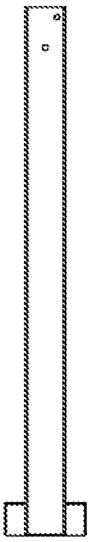
FIG. 12 is a side view showing the threshold; the view showing the first center pillar.
Figure 13:
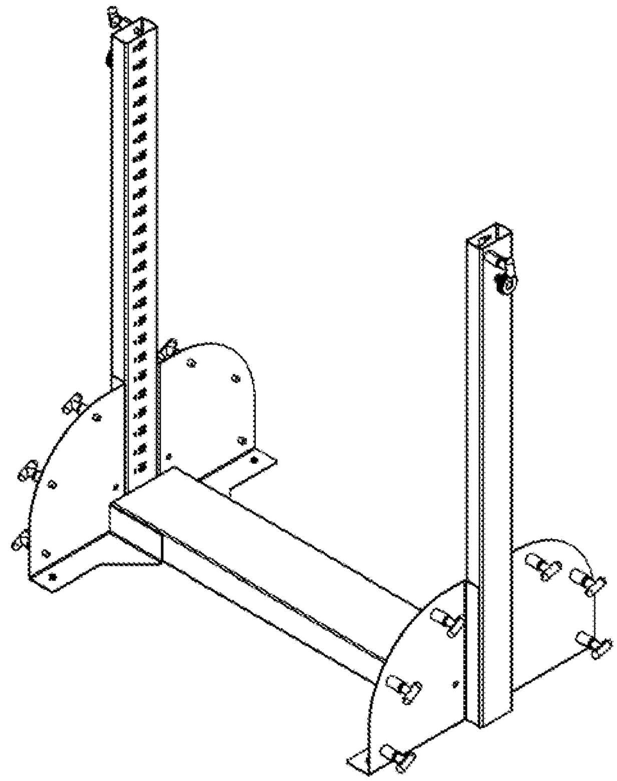
FIG. 13 is a top, perspective view showing the threshold; the view showing a plurality of angle support features; the view showing the first center pillar; the view showing the second center pillar.
Figure 14:
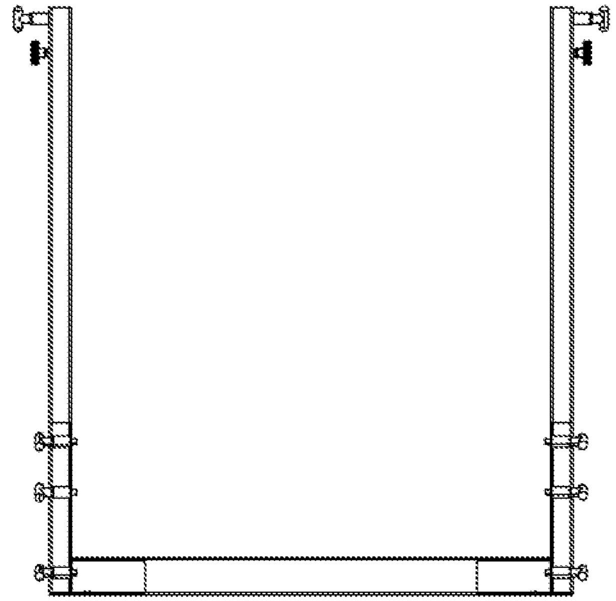
FIG. 14 is a front view showing the threshold; the view showing a plurality of angle support features; the view showing the first center pillar; the view showing the second center pillar.
Figure 15:
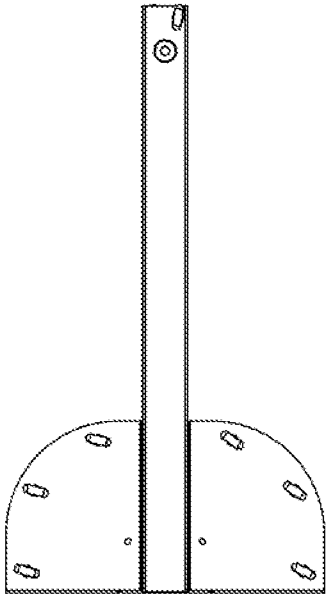
FIG. 15 is a side view showing the threshold; the view showing a plurality of angle support features; the view showing the first center pillar.
Figure 16:
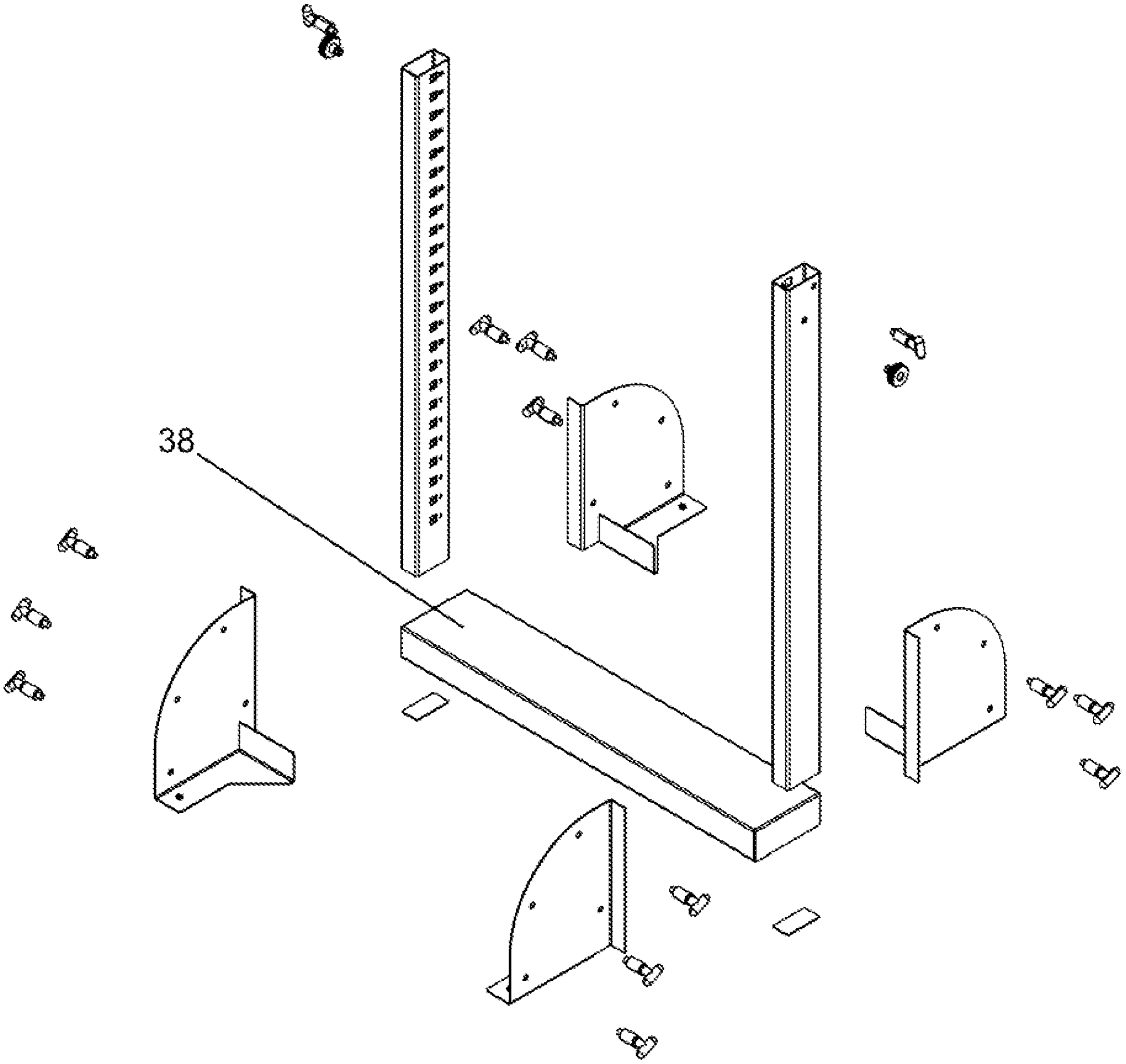
FIG. 16 is a top, perspective, exploded view showing the threshold; the view showing a plurality of angle support features; the view showing the first center pillar; the view showing the second center pillar.
Figure 17:
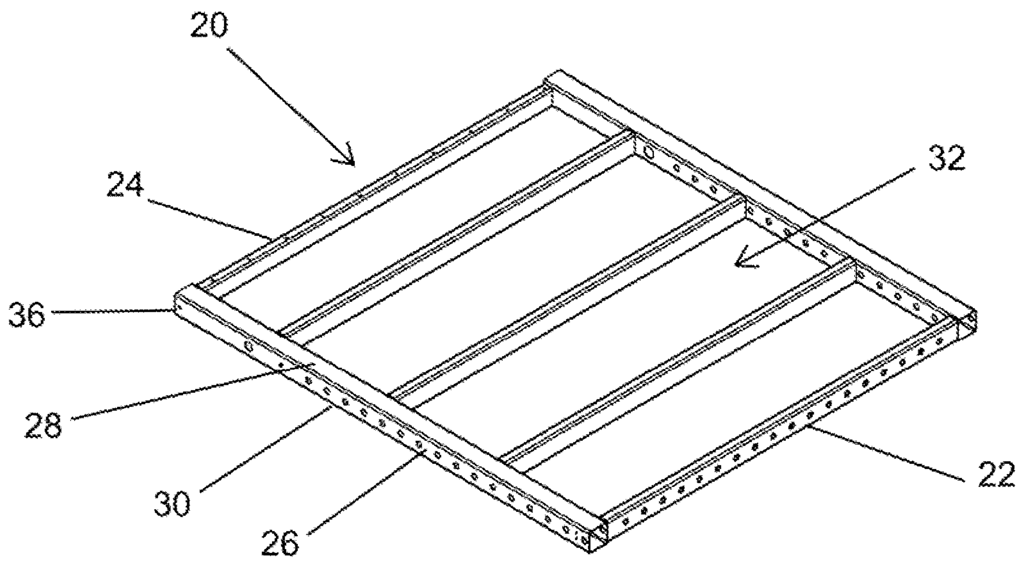
FIG. 17 is a top, perspective view showing the platform frame.
Figure 18:
FIG. 18 is a front view showing the platform frame.
Figure 19:
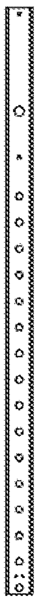
FIG. 19 is a side view showing the platform frame.
Figure 20:
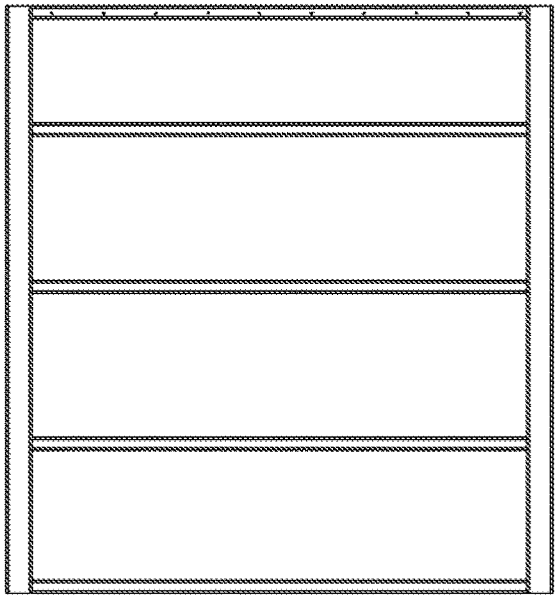
FIG. 20 is a bottom view showing the platform frame.
Figure 21:
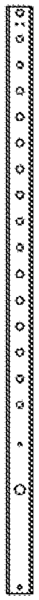
FIG. 21 is a side view showing the platform frame.
Figure 22:
FIG. 22 is a rear view showing the platform frame.
Figure 23:
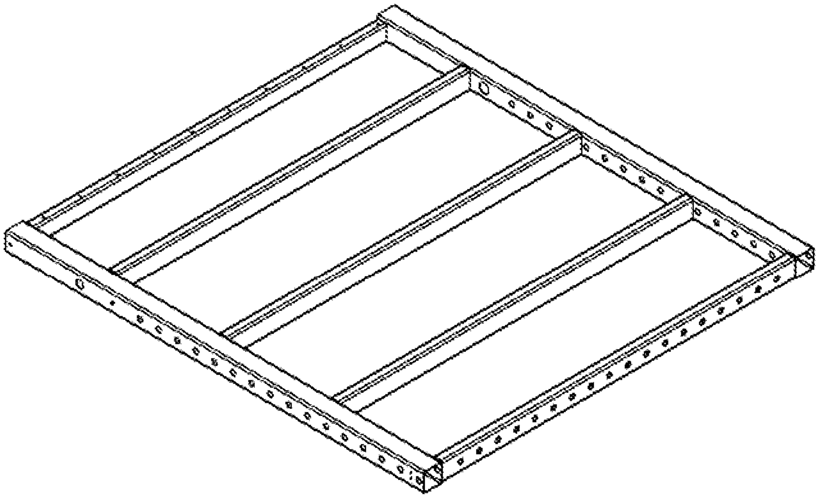
FIG. 23 is a top, perspective view showing the platform frame.
Figure 24:
FIG. 24 is a front view showing the platform frame.
Figure 25:
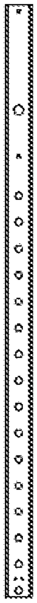
FIG. 25 is a side view showing the platform frame.
Figure 26:
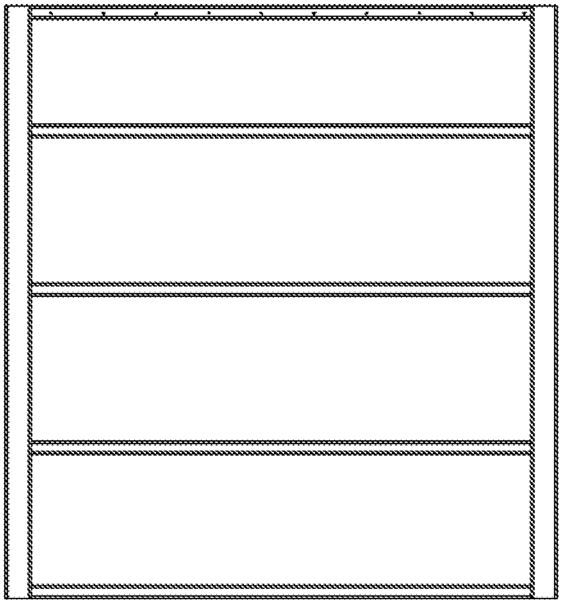
FIG. 26 is a bottom view showing the platform frame.
Figure 27:
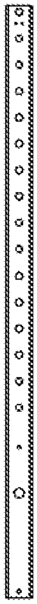
FIG. 27 is a side view showing the platform frame.
Figure 28:
FIG. 28 is a rear view showing the platform frame.
Figure 29:
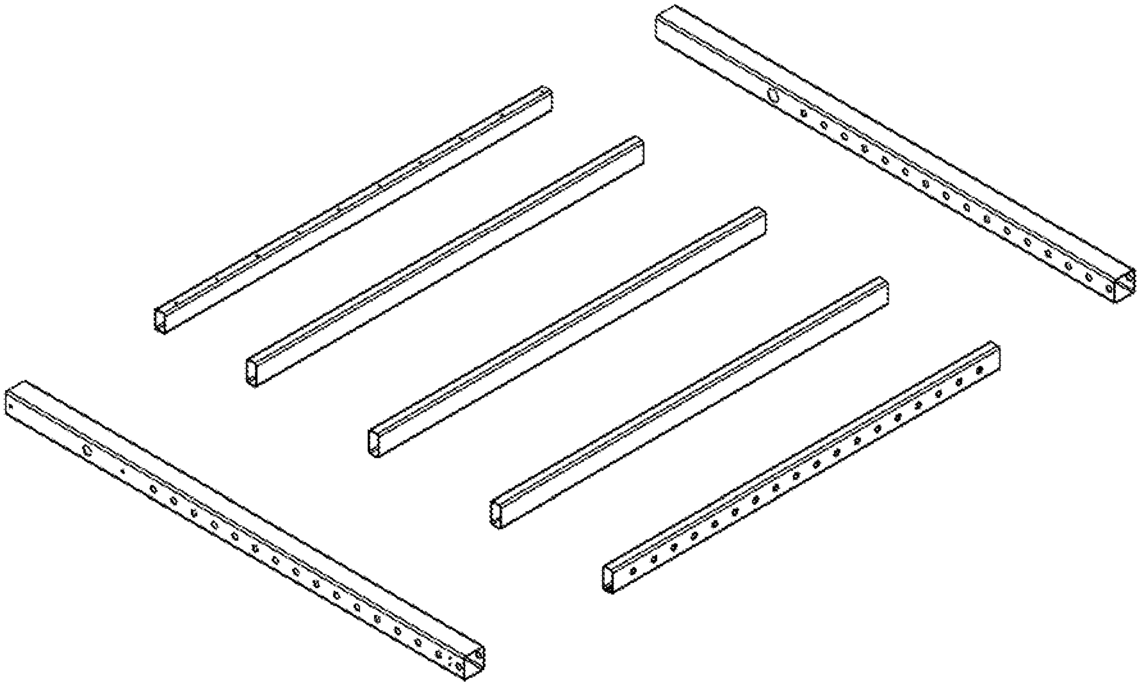
FIG. 29 is a top, perspective, exploded view showing the platform frame.
Figure 30:
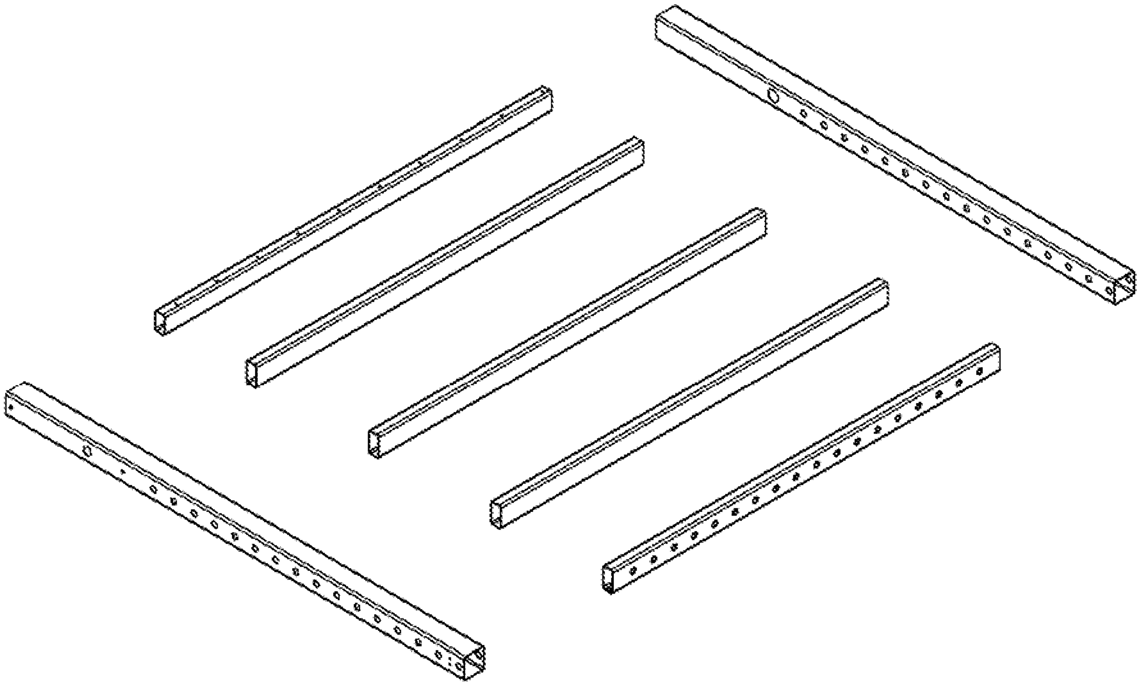
FIG. 30 is a top, perspective, exploded view showing the platform frame.
Figure 31:
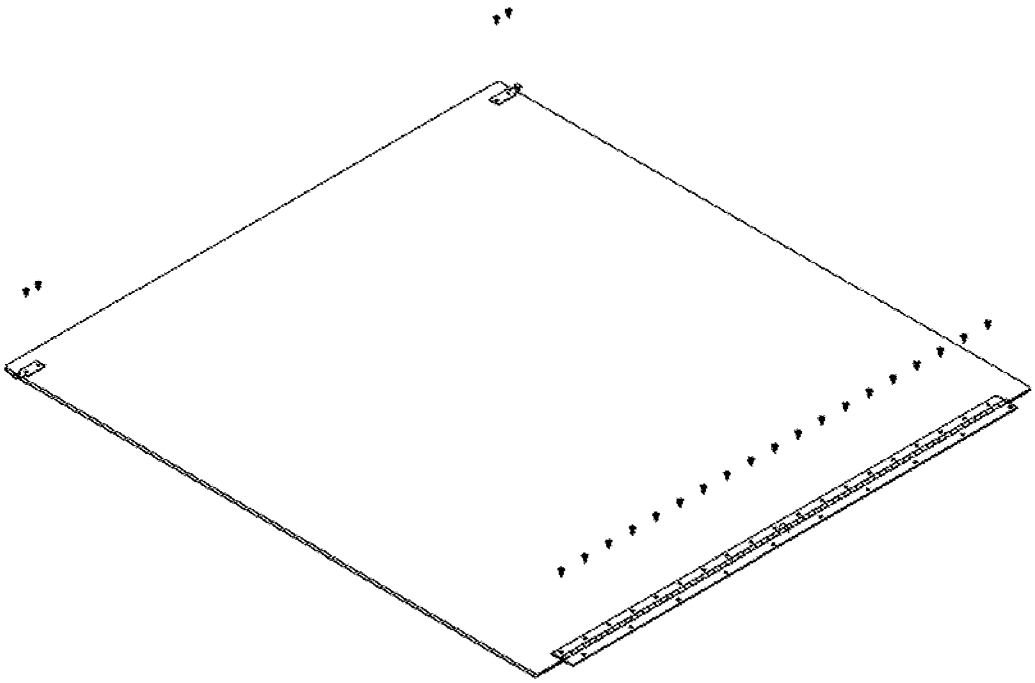
FIG. 31 is a top, perspective view showing the stable top platform; the view showing attachment features; the view showing hinge features.
Figure 32:
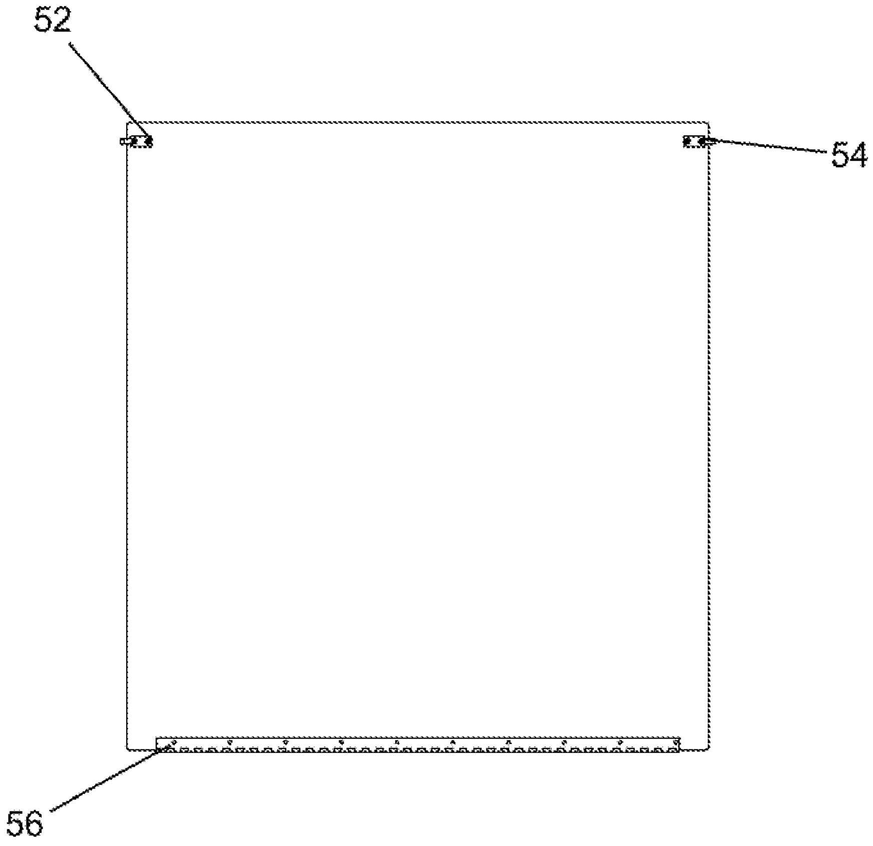
FIG. 32 is a top view showing the stable top platform; the view showing attachment features; the view showing hinge features.
Figure 33:
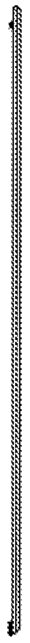
FIG. 33 is a side view showing the stable top platform; the view showing attachment features; the view showing hinge features.
Figure 34:
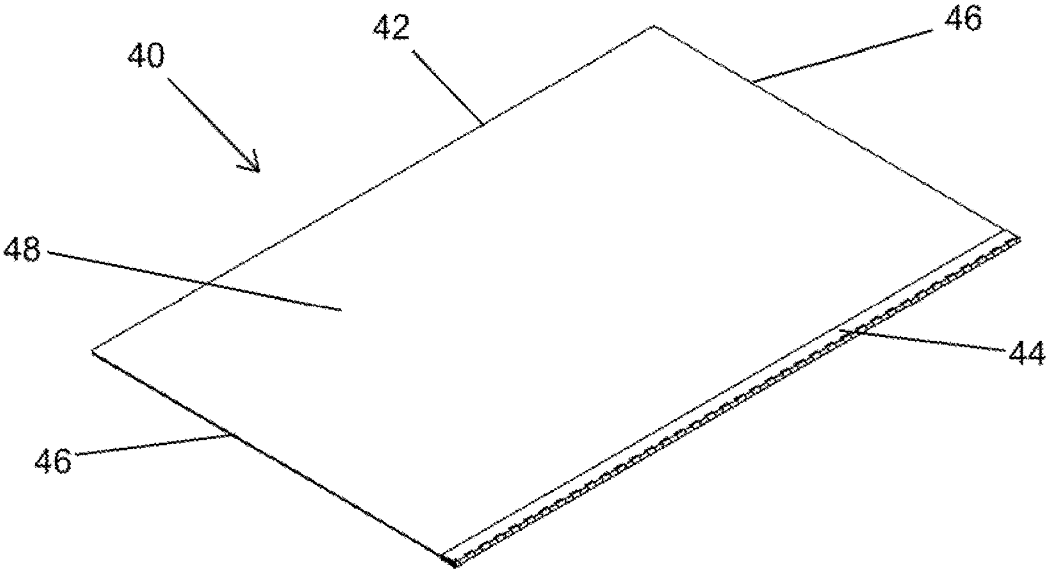
FIG. 34 is a top, perspective view showing the stable top platform; the view showing attachment features; the view showing hinge features.
Figure 35:
FIG. 35 is a side view showing the stable top platform; the view showing attachment features; the view showing hinge features.
Figure 36:
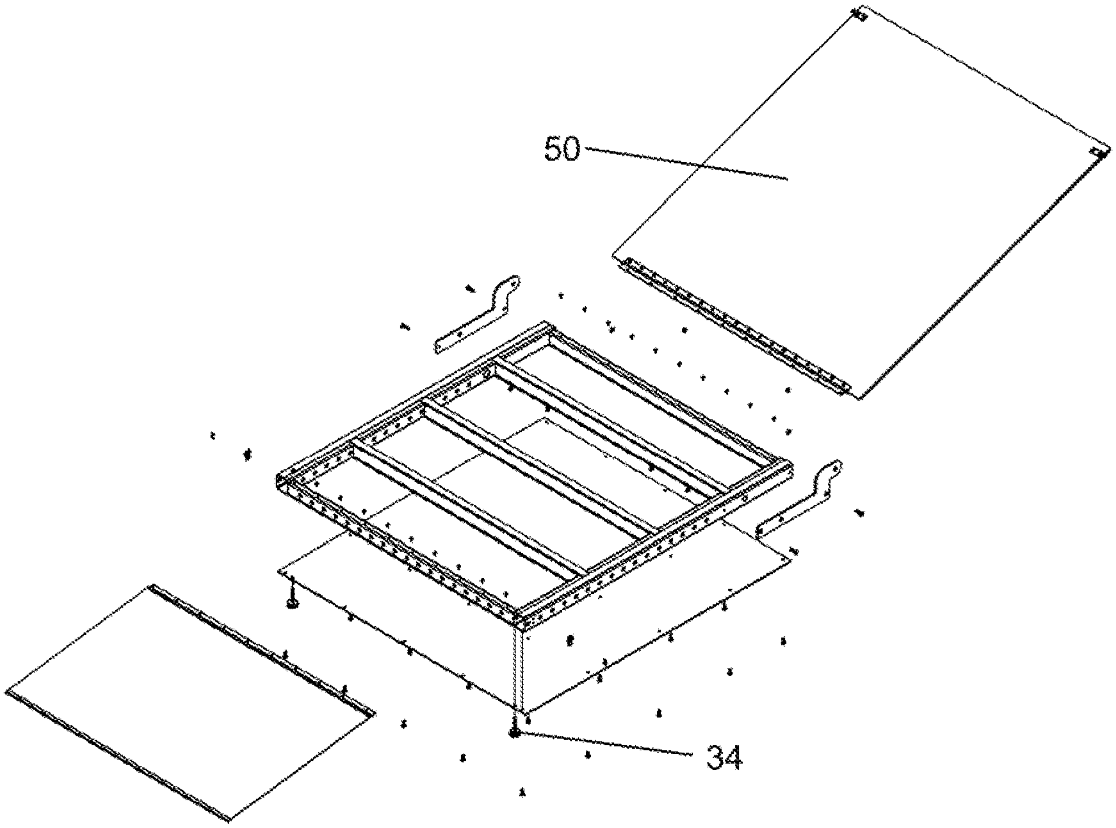
FIG. 36 is a top, perspective view showing the platform frame; the view showing the stable top platform; the view showing attachment features; the view showing hinge features; the view showing a bottom support feature; the view showing feet; the view showing attachment features.
Figure 41:
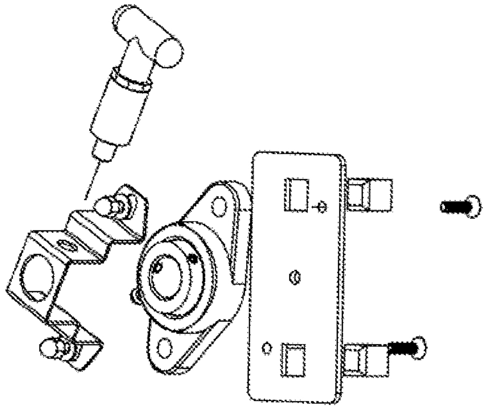
FIG. 41 is a view showing crossbar attachment features.
Figure 42:
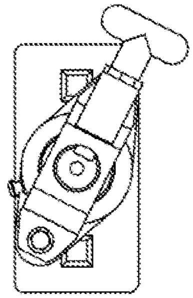
FIG. 42 is a view showing crossbar attachment features.
Figure 43:
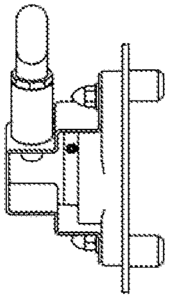
FIG. 43 is a view showing crossbar attachment features.
Figure 44:
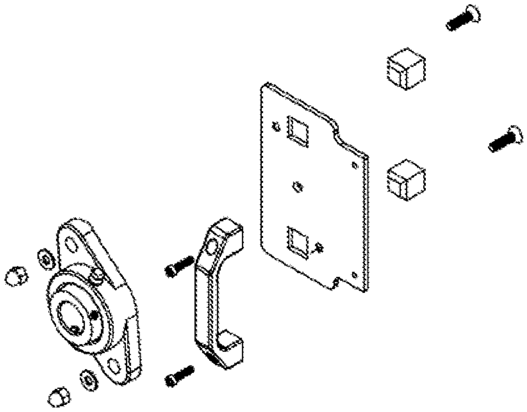
FIG. 44 is a view showing crossbar attachment features.
Figure 45:
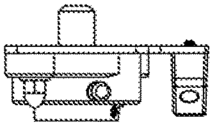
FIG. 45 is a view showing crossbar attachment features.
Figure 46:
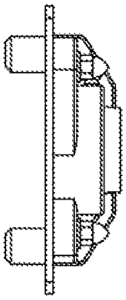
FIG. 46 is a view showing crossbar attachment features.
Figure 47:
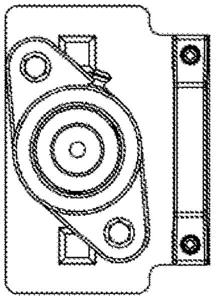
FIG. 47 is a view showing crossbar attachment features.
Figure 48:
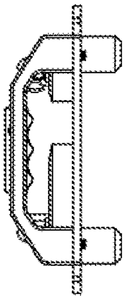
FIG. 48 is a view showing crossbar attachment features.
Figure 49:
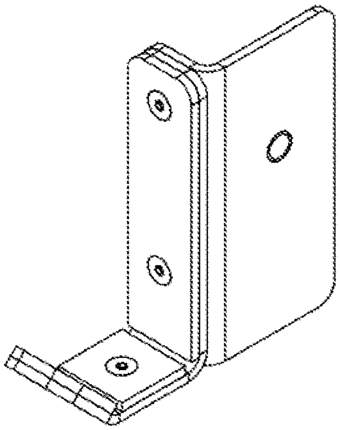
FIG. 49 is a view showing crossbar attachment features.
Figure 50:
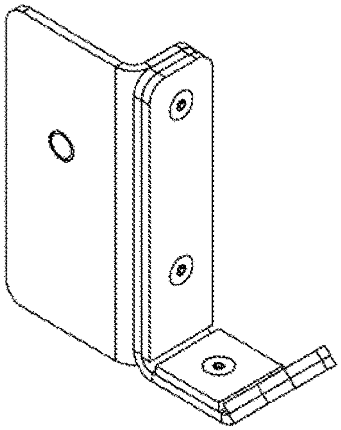
FIG. 50 is a view showing crossbar attachment features.
Figure 51:
FIG. 51 is a view showing crossbar attachment features.
Figure 52:
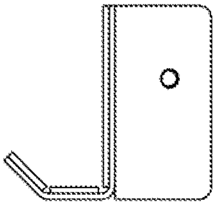
FIG. 52 is a view showing crossbar attachment features.
Figure 53:
FIG. 53 is a view showing crossbar attachment features.
Figure 54:
FIG. 54 is a view showing crossbar attachment features.
Figure 55:
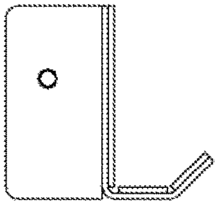
FIG. 55 is a view showing crossbar attachment features.
Figure 56:
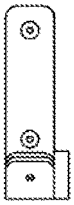
FIG. 56 is a view showing crossbar attachment features.
Figure 57:
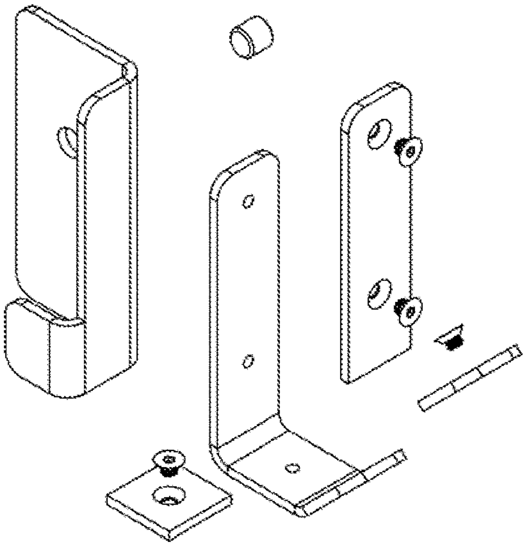
FIG. 57 is a view showing crossbar attachment features.
Figure 58:
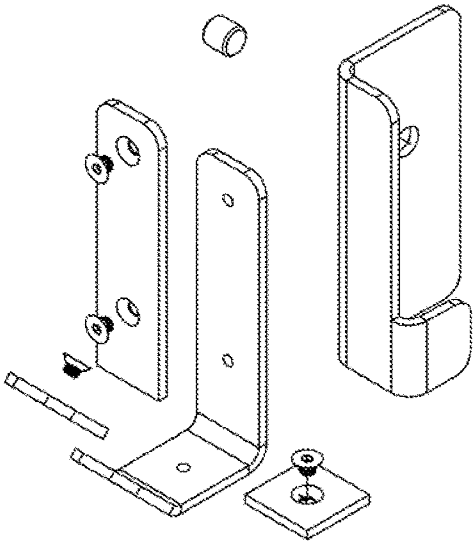
FIG. 58 is a view showing crossbar attachment features.
Figure 59:
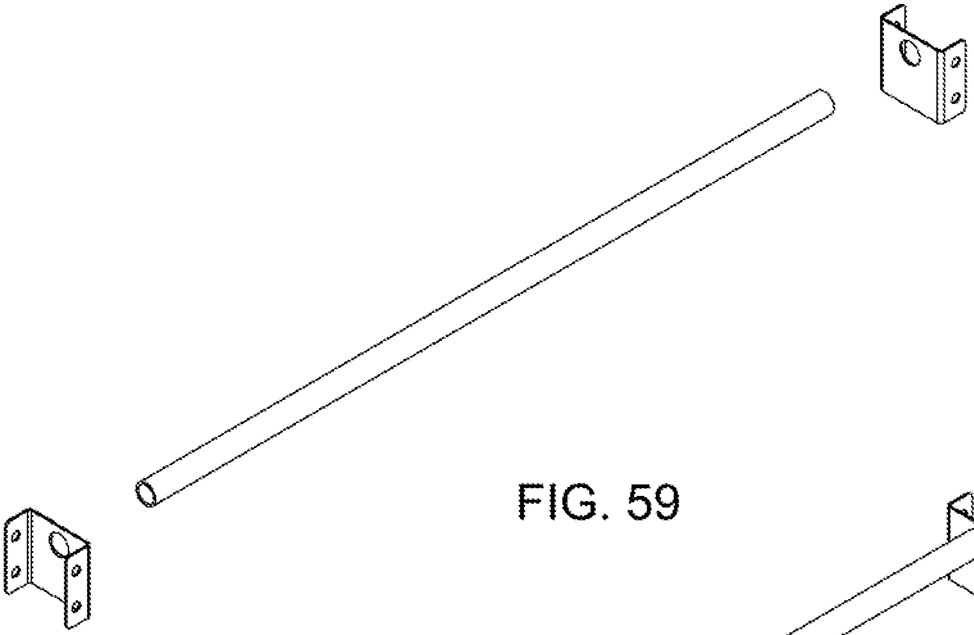
FIG. 59 is a top, perspective view showing a crossbar; the view showing crossbar attachment features.
Figure 60:
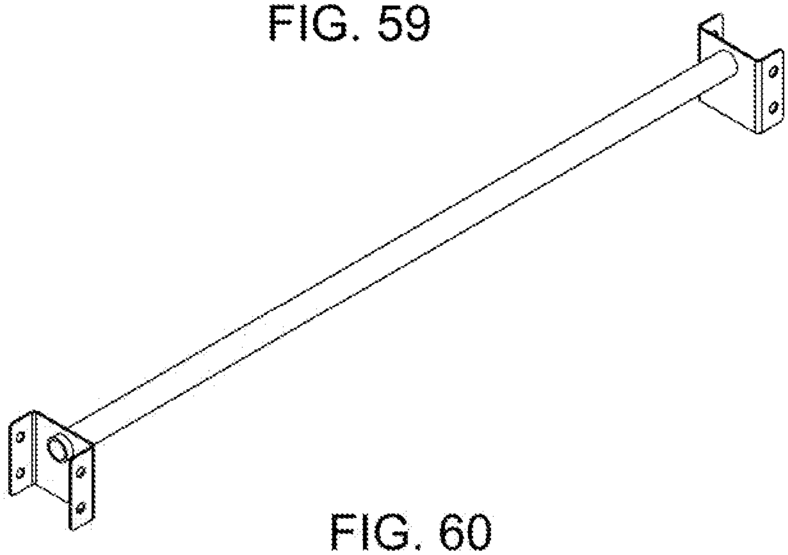
FIG. 60 is a top, perspective view showing a crossbar; the view showing crossbar attachment features.
Figure 61:
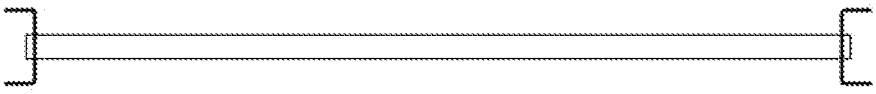
FIG. 61 is front view showing a crossbar; the view showing crossbar attachment features.
Figure 62:
FIG. 62 is a side view showing a crossbar; the view showing crossbar attachment features.
Figure 63:
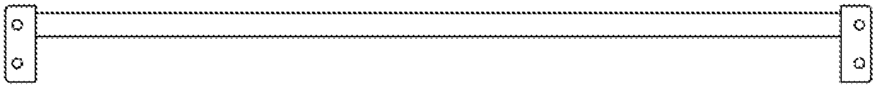
FIG. 63 is a rear view showing a crossbar; the view showing crossbar attachment features.
Figure 64:
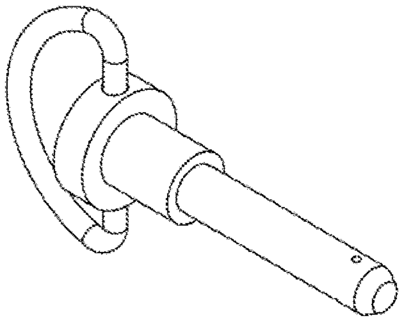
FIG. 64 is a view showing a lock pin.
Figure 65:
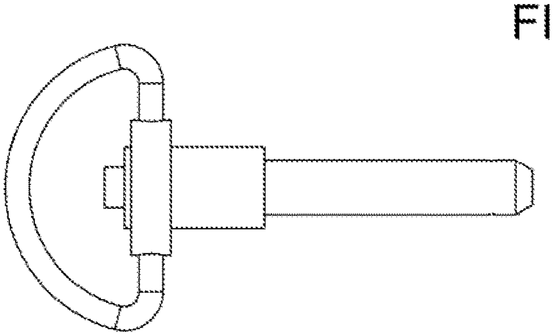
FIG. 65 is a view showing a lock pin.
Figure 66:
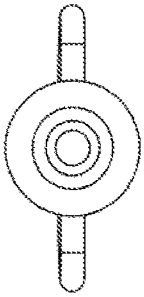
FIG. 66 is a view showing a lock pin.
Figure 67:
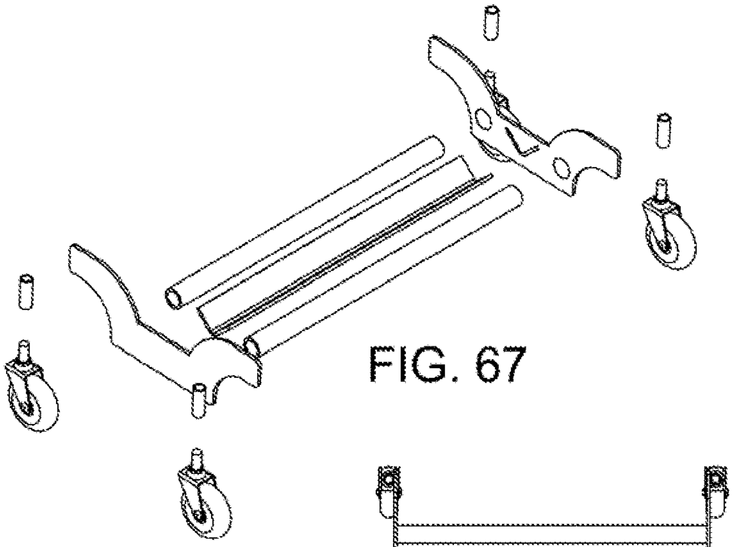
FIG. 67 is a view showing the cart with wheels for rolling and/or moving the system.
Figure 68:
FIG. 68 is a view showing the cart with wheels for rolling and/or moving the system.
Figure 69:
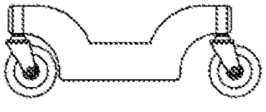
FIG. 69 is a view showing the cart with wheels for rolling and/or moving the system.
Figure 70:
FIG. 70 is a view showing the cart with wheels for rolling and/or moving the system.
Figure 71:
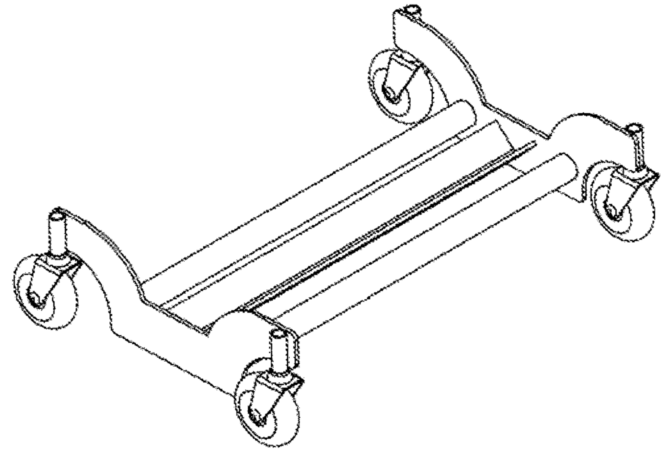
FIG. 71 is a view showing the cart with wheels for rolling and/or moving the system.
Figure 72:
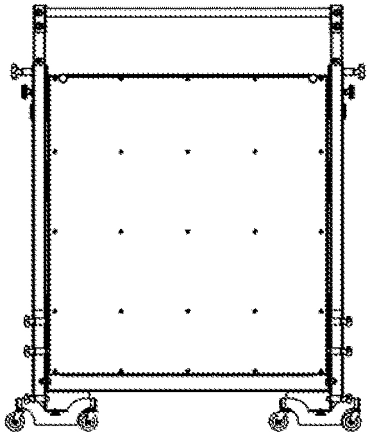
FIG. 72 is a front view showing the rehabilitation system; the view showing the cart with wheels engaged with the system.
Figure 73:
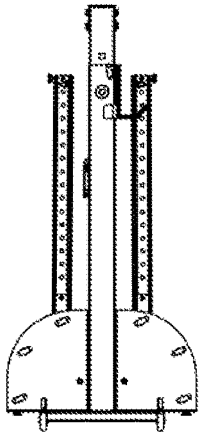
FIG. 73 is a side view showing the rehabilitation system; the view showing the cart with wheels engaged with the system.
Figure 74:
FIG. 74 is a view showing a telescoping extension feature.
Figure 75:
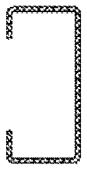
FIG. 75 is a view showing a telescoping extension feature.
Figure 76:
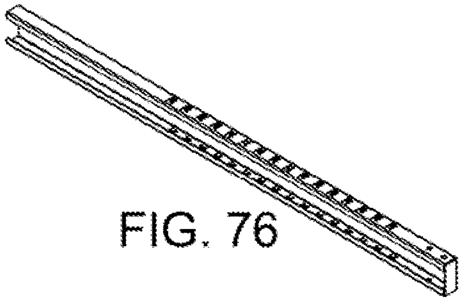
FIG. 76 is a view showing a telescoping extension feature.
Figure 77:
FIG. 77 is a view showing a telescoping extension feature.
Figure 78:
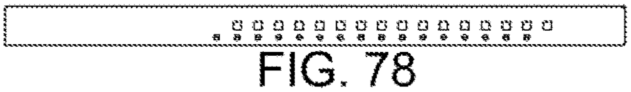
FIG. 78 is a view showing a telescoping extension feature.
Figure 79:
FIG. 79 is a view showing a telescoping extension feature.
Figure 80:
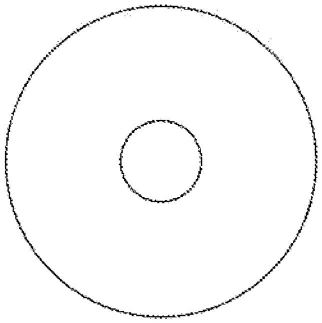
FIG. 80 is a view showing a washer.
Figure 81:
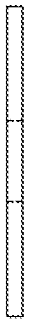
FIG. 81 is a view showing a washer.
Figure 82:
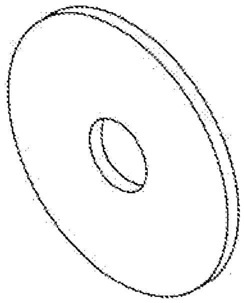
FIG. 82 is a view showing a washer.
Figure 83:
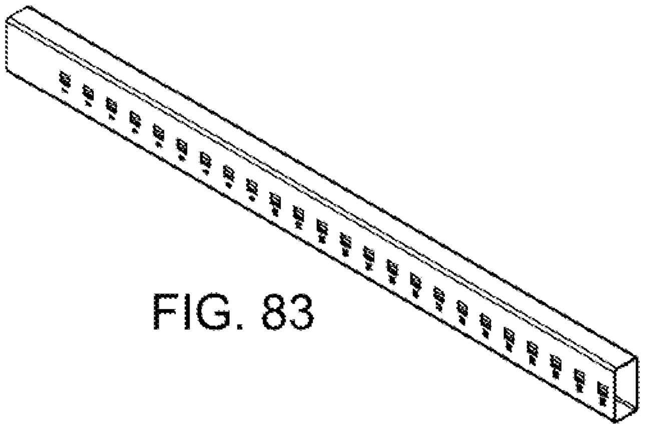
FIG. 83 is a view showing a telescoping extension feature.
Figure 84:
FIG. 84 is a view showing a telescoping extension feature.
Figure 85:
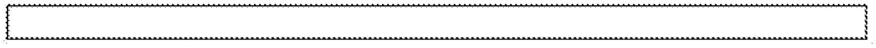
FIG. 85 is a view showing a telescoping extension feature.
Figure 86:
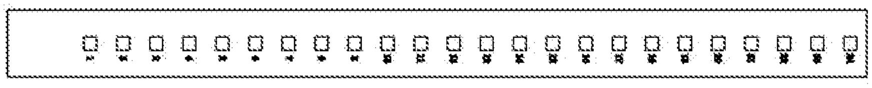
FIG. 86 is a view showing a telescoping extension feature.
Figure 87:
FIG. 87 is a view showing a telescoping extension feature.
Figure 88:
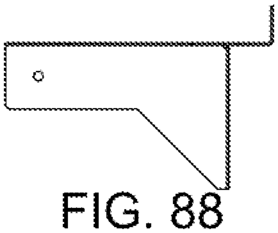
FIG. 88 is a view showing an angle support feature.
Figure 89:
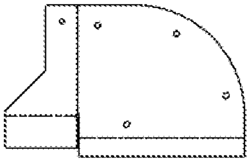
FIG. 89 is a view showing an angle support feature.
Figure 90:
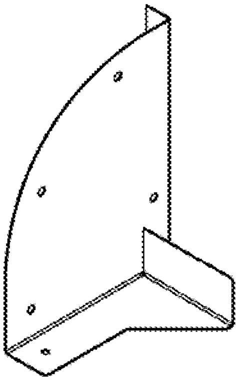
FIG. 90 is a view showing an angle support feature.
Figure 91:
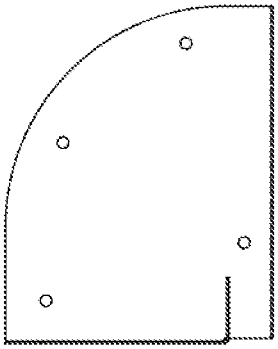
FIG. 91 is a view showing an angle support feature.
Figure 92:
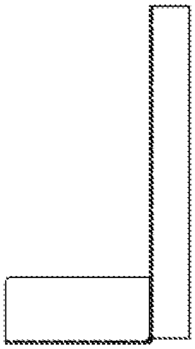
FIG. 92 is a view showing an angle support feature.
Figure 93:
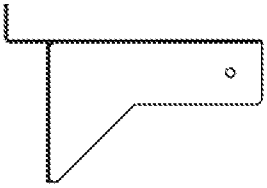
FIG. 93 is a view showing an angle support feature.
Figure 94:
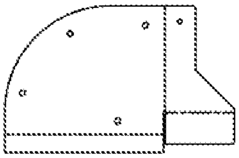
FIG. 94 is a view showing an angle support feature.
Figure 95:
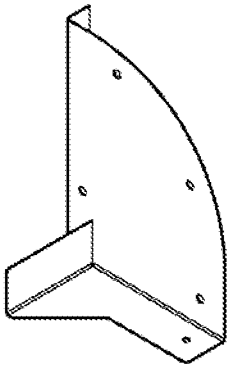
FIG. 95 is a view showing an angle support feature.
Figure 96:
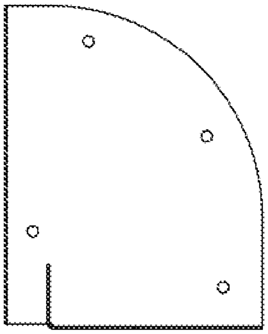
FIG. 96 is a view showing an angle support feature.
Figure 97:
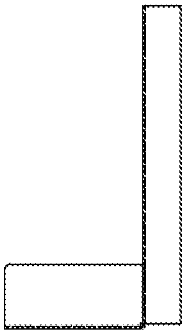
FIG. 97 is a view showing an angle support feature.
Figure 123:
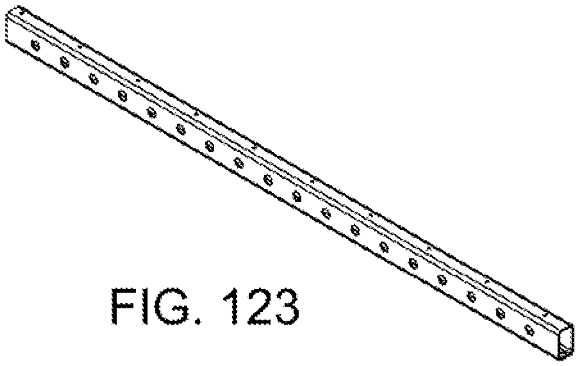
Figure 124:
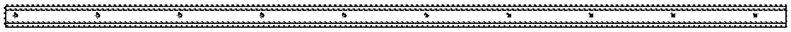
Figure 125:
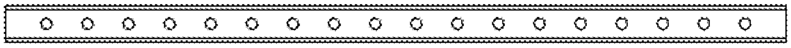
Figure 127:
Figure 126:
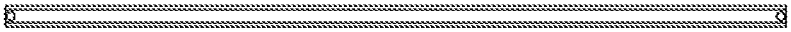
Figure 128:
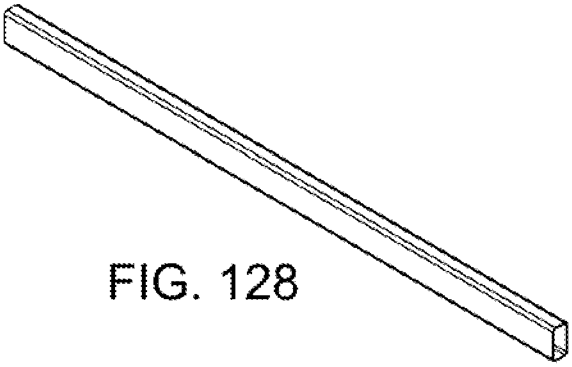
Figure 129:
Figure 130:
Figure 132:
Figure 131:
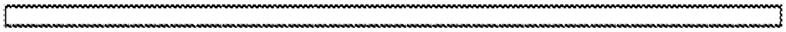

FIG. 132 is a view showing a support feature.

FIG. 133 is a view showing a support feature.

FIG. 134 is a view showing a support feature.

FIG. 135 is a view showing a support feature.

FIG. 136 is a view showing a support feature.

FIG. 137 is a view showing a support feature.

FIG. 138 is a view showing a support feature.

FIG. 139 is a view showing a support feature.

FIG. 140 is a view showing a support feature.

FIG. 141 is a view showing a support feature.

FIG. 142 is a view showing a support feature.

FIG. 143 is a view showing the stable top platform.

FIG. 144 is a view showing the stable top platform.

FIG. 145 is a view showing the stable top platform.

FIG. 146 is a view showing the stable top platform.

FIG. 147 is a view showing a support feature.

FIG. 148 is a view showing a support feature.

FIG. 149 is a view showing a support feature.

FIG. 150 is a view showing a support feature.

FIG. 151 is a view showing a support feature.

Figure 152:
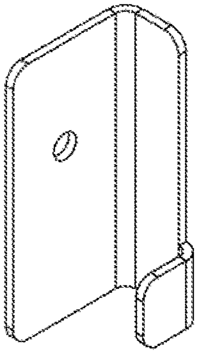

FIG. 152 is a view showing a support feature.

Figure 153:
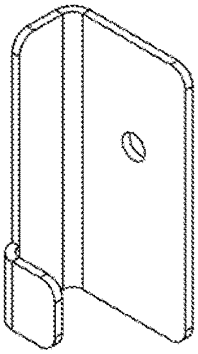

FIG. 153 is a view showing a support feature.

Figure 154:
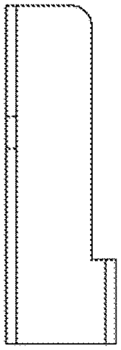

FIG. 154 is a view showing a support feature.

Figure 155:
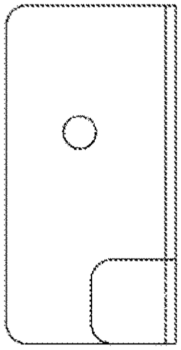

FIG. 155 is a view showing a support feature.

Figure 156:
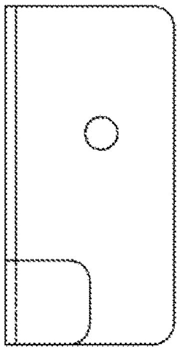

FIG. 156 is a view showing a support feature.

Figure 157:
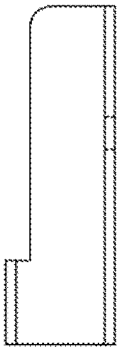

FIG. 157 is a view showing a support feature.

Figure 158:
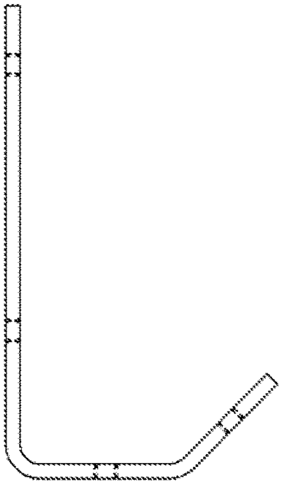

FIG. 158 is a view showing an attachment feature.

Figure 159:
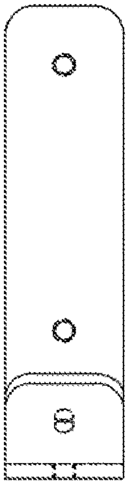

FIG. 159 is a view showing an attachment feature.

Figure 160:
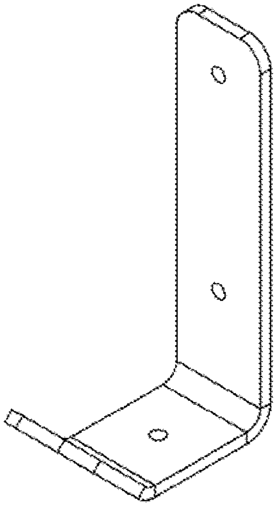
Figure 161:
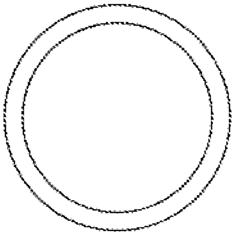
Figure 162:
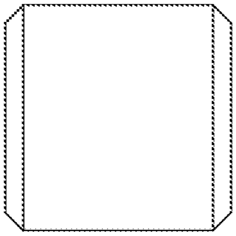
Figure 163:
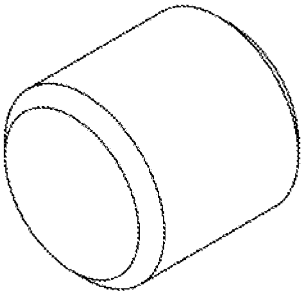
Figure 164:
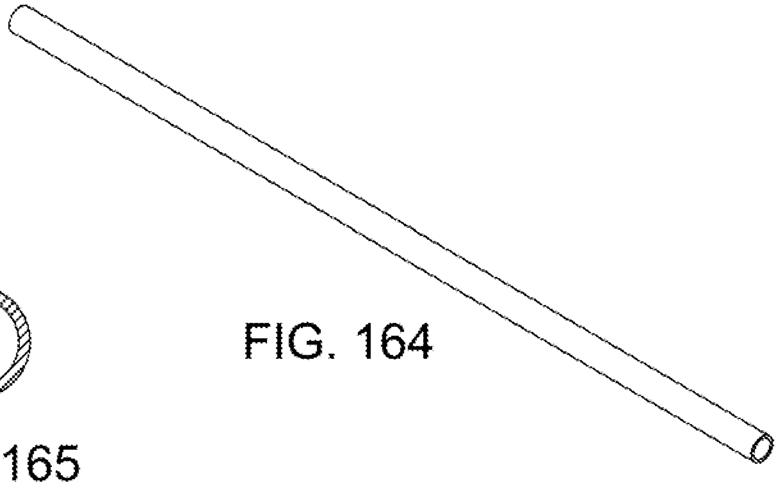
Figure 165:
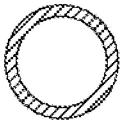
Figure 166:
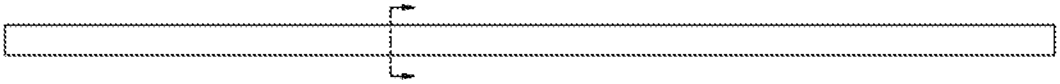
Figure 167:
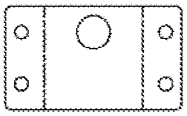
Figure 168:
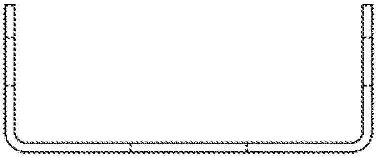
Figure 169:
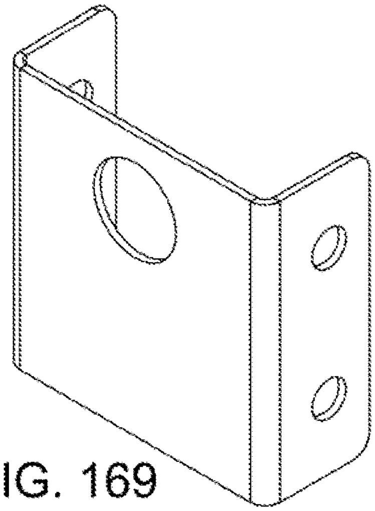
Figure 170:
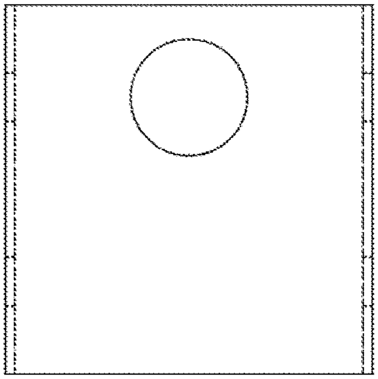
Figure 171:
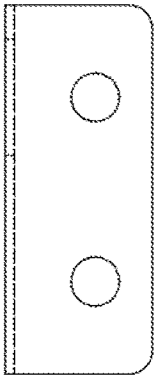
Figure 172:
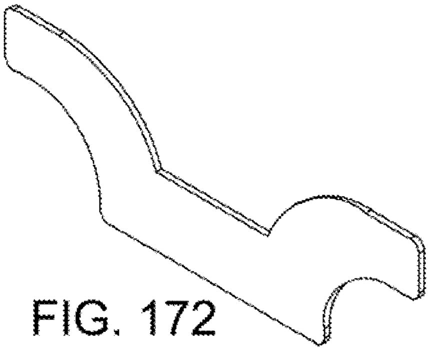
Figure 173:
Figure 174:
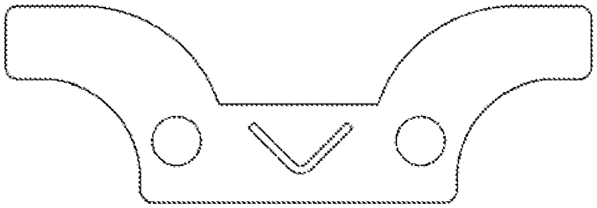
Figure 175:
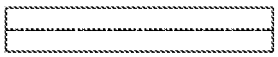
Figure 176:
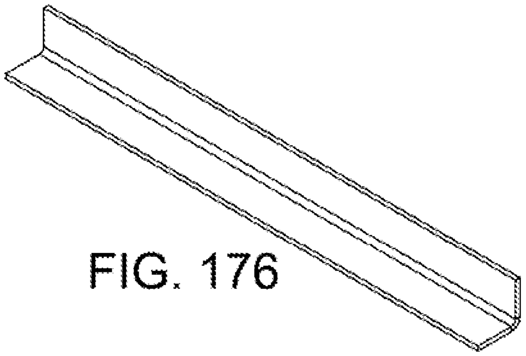
Figure 177:
Figure 178:
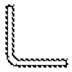
Figure 179:
Figure 180:
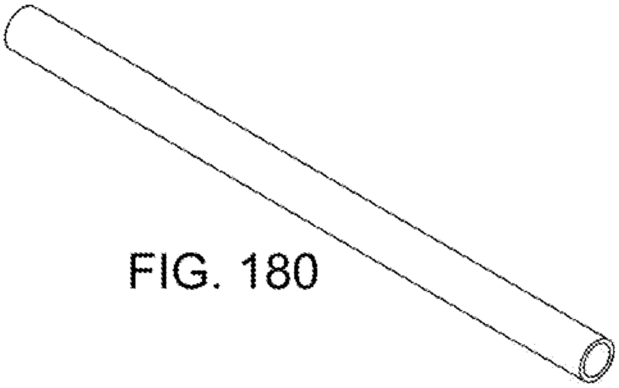
Figure 181:
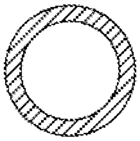
Figure 182:
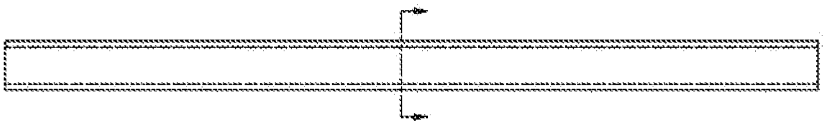
Figure 183:
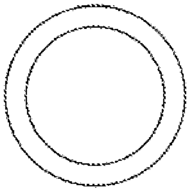
Figure 184:
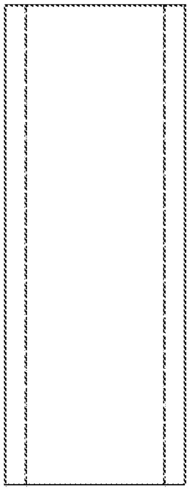
Figure 185:
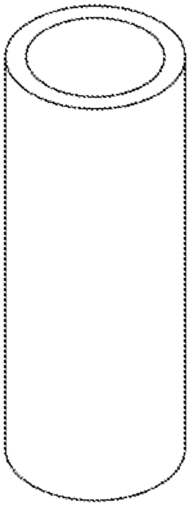
Figure 186:
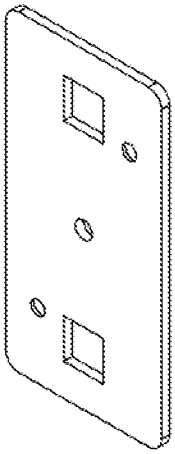
Figure 187:
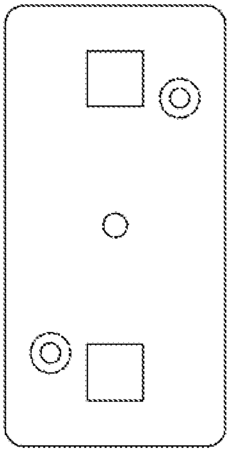
Figure 188:
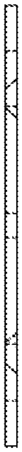
Figure 189:
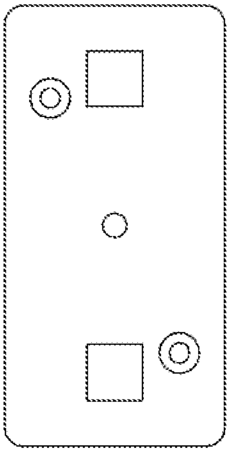
Figure 190:
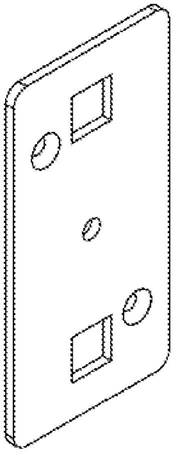
Figure 191:
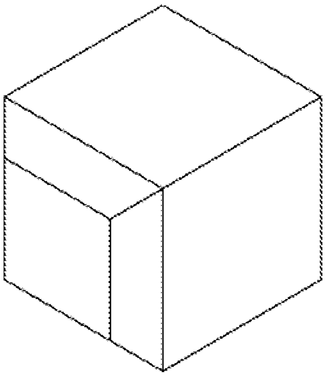
Figure 192:
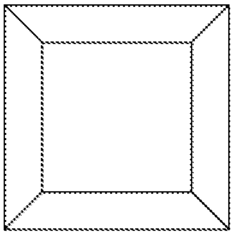
Figure 193:
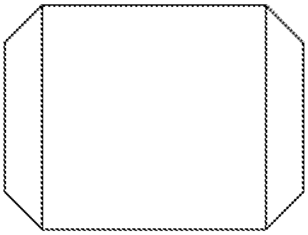
Figure 194:
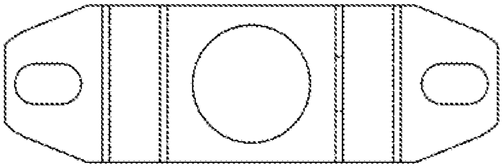
Figure 195:
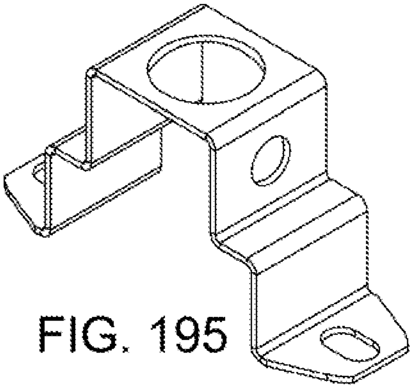
Figure 196:
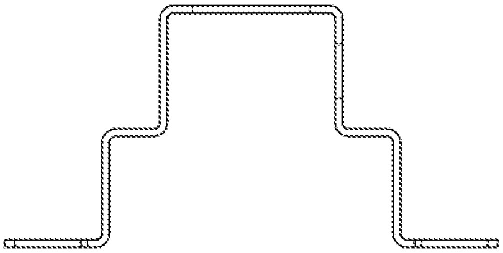
Figure 197:
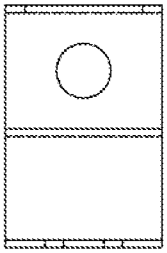
Figure 206:
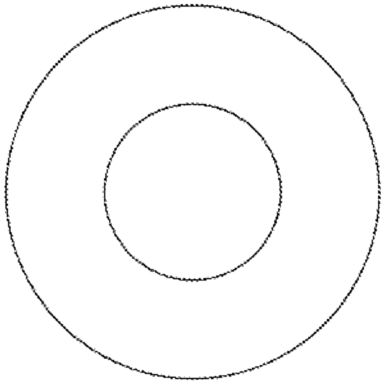
Figure 207:
Figure 208:
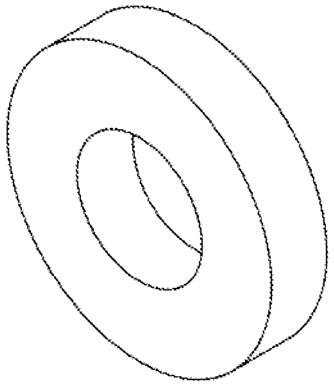
Figure 209:
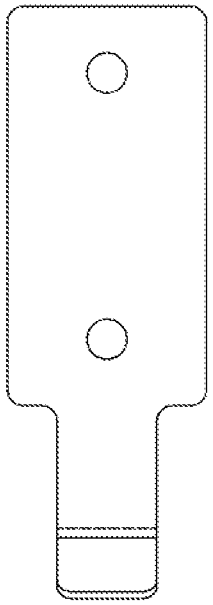
Figure 210:
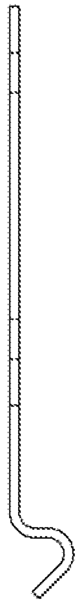
Figure 211:
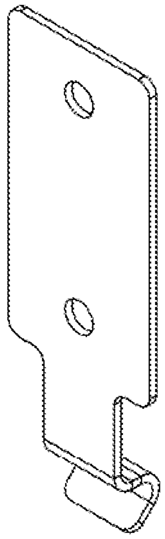
Figure 212:
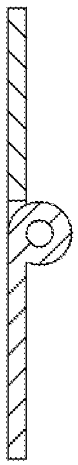
Figure 213:
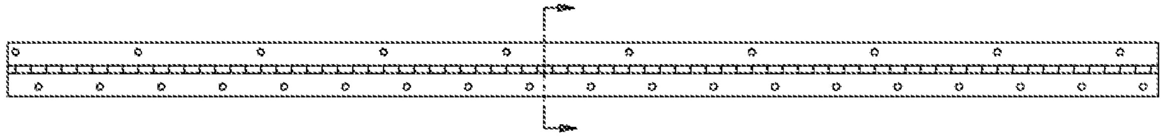
Figure 214:
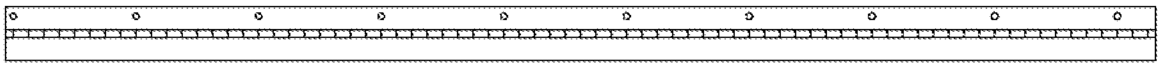

FIG. 160 is a view showing an attachment feature.
FIG. 161 is a view showing a crossbar attachment feature.
FIG. 162 is a view showing a crossbar attachment feature.
FIG. 163 is a view showing a crossbar attachment feature.
FIG. 164 is a view showing a crossbar.
FIG. 165 is a cross sectional view showing a crossbar.
FIG. 166 is a view showing a crossbar.
FIG. 167 is a view showing a crossbar attachment feature.
FIG. 168 is a view showing a crossbar attachment feature.
FIG. 169 is a view showing a crossbar attachment feature.
FIG. 170 is a view showing a crossbar attachment feature.
FIG. 171 is a view showing a crossbar attachment feature.
FIG. 172 is a view showing a crossbar attachment feature.
FIG. 173 is a view showing a crossbar attachment feature.
FIG. 174 is a view showing a crossbar attachment feature.
FIG. 175 is a view showing a support feature.
FIG. 176 is a view showing a support feature.
FIG. 177 is a view showing a support feature.
FIG. 178 is a view showing a support feature.
FIG. 179 is a view showing a support feature.
FIG. 180 is a view showing a crossbar.
FIG. 181 is a cross sectional view showing a crossbar.
FIG. 182 is a view showing a crossbar.
FIG. 183 is a view showing a crossbar feature.
FIG. 184 is a view showing a crossbar feature.
FIG. 185 is a view showing a crossbar feature.
FIG. 186 is a view showing a crossbar attachment feature.
FIG. 187 is a view showing a crossbar attachment feature.
FIG. 188 is a view showing a crossbar attachment feature.
FIG. 189 is a view showing a crossbar attachment feature.
FIG. 190 is a view showing a crossbar attachment feature.
FIG. 191 is a view showing a crossbar attachment feature.
FIG. 192 is a view showing a crossbar attachment feature.
FIG. 193 is a view showing a crossbar attachment feature.
FIG. 194 is a view showing a crossbar attachment feature.
FIG. 195 is a view showing a crossbar attachment feature.
FIG. 196 is a view showing a crossbar attachment feature.
FIG. 197 is a view showing a crossbar attachment feature.
FIG. 198 is a view showing a crossbar attachment feature.
FIG. 199 is a view showing a crossbar attachment feature.
FIG. 200 is a view showing a crossbar attachment feature.
FIG. 201 is a view showing a crossbar attachment feature.
FIG. 202 is a view showing a crossbar attachment feature.
FIG. 203 is a view showing a crossbar.
FIG. 204 is a cross sectional view showing a crossbar.
FIG. 205 is a view showing a crossbar.
FIG. 206 is a view showing a crossbar attachment feature.
FIG. 207 is a view showing a crossbar attachment feature.
FIG. 208 is a view showing a crossbar attachment feature.
FIG. 209 is a view showing a crossbar attachment feature.
FIG. 210 is a view showing a crossbar attachment feature.
FIG. 211 is a view showing a crossbar attachment feature.
FIG. 212 is a view showing a hinge feature.
FIG. 213 is a view showing a hinge feature.
FIG. 214 is a view showing a hinge feature.

DETAILED DESCRIPTION OF THE DISCLOSURE

In the following detailed description, reference is made to the accompanying drawings which form a part hereof, and in which is shown by way of illustration specific embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the disclosure(s). The following detailed description is, therefore, not to be taken in a limiting sense, and the scope of the disclosure(s) is defined only by the appended claims, along with the full scope of equivalents to which such claims are entitled.

As used herein, the terminology such as vertical, horizontal, top, bottom, front, back, end, sides and the like are referenced according to the views, pieces and figures presented. It should be understood, however, that the terms are used only for purposes of description, and are not intended to be used as limitations. Accordingly, orientation of an object or a combination of objects may change without departing from the scope of the disclosure.

Reference throughout this specification to "one embodiment," "an embodiment," "one example," or "an example" means that a particular feature, structure, or characteristic described in connection with the embodiment or example is included in at least one embodiment of the present disclosure. Thus, the appearance of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium.

In the arrangement shown, as one example, a rehabilitative and corrective system, a strength building system, a recovery system, a muscle activation system, and methods of use are presented. In the arrangement shown, as one example, a stable platform with multiple equipment attachments, an adjustable set of pillars with a stable rotating crossbar, and a storage compartment for dowels and other rehabilitative equipment are provided, which can be customized for individual musculoskeletal needs. In this way, the present disclosure provides the state of the art with a novel activation and release platform, which includes a plurality of components and functionality.

System:

With reference to the figures, a rehabilitative and corrective system, a strength building system, a recovery system, a muscle activation system, and methods of use 10 (hereafter referred to as a "rehabilitative system", "a release platform", an "activation platform", a "corrective system", a "strength building system", a "recovery platform", a "muscle activation system", or simply "system") is presented. Rehabilitative system 10 is formed of any suitable size, shape and design.

In the arrangement shown, the strength building platform 10 provides a novel activation and release platform. The corrective system 10 is configured to provide an integrated adjustable pillar component and center bar components with adjustable cams. The adjustable cams are configured to provide the ability to rotate the center bar about an axis. Similarly the adjustable cams are configured to lock the center bar in place and/or adjust the height of the center bar based on the exercise design.

Furthermore, and in the arrangement shown, the rehabilitative platform 10 is configured as a collapsible platform. In this way, the collapsible platform provides a stable exercise base which can be compacted for storage and space savings. Similarly, the configuration provides for a ninety degree storage position for space and/or exercise modifications, and the like.

Furthermore, and in the arrangement shown, the rehabilitative system 10 includes storage functionality. In other words, system 10 includes a storage compartment (to be further described herein), located conveniently in the platform. This provides for easy access and convenient storage of exercise equipment and other components.

Furthermore, and in the arrangement shown, the center bar provides for an attachment point, in addition to attachment features, for the configuring and/or attachment of accessory exercise equipment. Similarly, this center bar not only provides for attachment of accessory exercise equipment but can also be configured to attach third party and/or other exercise equipment and arrangements not disclosed herein. These alternative configures may vary greatly in treatment and exercise and are hereby contemplated for use.

In the arrangement shown, as one example, system 10 is formed of an integrated pillar and center bar component with integrated adjustable cams. These components provide the ability to rotate and/or lock the center bar. Furthermore, these components are configured to adjust the height of the center bar. These adjustments and/or formations of configuration vary based on the particular exercise and/or movement and/or release and/or activation which is needed and/or desired.

In the arrangement shown, as one example, system 10 includes a collapsible platform that provides a stable exercise location. Furthermore, the stable platform can be compacted and/or stored for space savings. Furthermore, the position of the stable platform can be modified to various orientations for various workout and/or exercise modification requirements.

In the arrangement shown, as one example, activation platform system 10 includes, in the embodiment(s) depicted, a user 12, a platform frame 20, a stable platform 40, a first center pillar 60, a second center pillar 80, a first crossbar 100, and a second crossbar 120, among other components, features, and functions.

User (or Plurality Thereof):

In the arrangement shown, as one example, system 10 may include a user. User may be any user interacting with or utilizing the system 10. This may include viewing, controlling, analyzing, manipulating, and/or interacting with system 10. User is not limited to a single user but may be a plurality of users. Furthermore, user is not limited to a user engaging with and/or exercising with platform 10. User may also include an instructor such as a medical professional. This medical professional may be a physical therapist, a medical doctor, an assistant, and the like.

Platform Frame:

In the arrangement shown, as one example, system 10 includes a platform frame 20. Platform frame 20 (also referred to simply as "frame", or "main body") is formed of any suitable size, shape, and design and is configured to provide the overall frame and main structural elements of the system 10. Additionally, platform frame 20 is configured to provide various attachment features and stabilization features for system 10.

In the arrangement shown, as one example, platform frame 20 is formed of metal. In the arrangement shown, frame 20 is formed of multiple steel parts which are channel metal and provide a stable structure for handling large weighted movements and the like. In the arrangement shown, as one example, the platform frame 20 is configured to work in concert with other components of system 10.

In the arrangement shown, as one example, the platform frame 20 is configured to adjust to various positions based on being used and/or stored and/or stowed. Similarly, the platform frame 20 is configured to work and/or integrate with a variety of other components and is also configured as part of the storage system. Furthermore, the platform frame 20 integrates and supports the pillars (to be further described herein).

In the arrangement shown, as one example, the frame 20 extends a length from a first end 22 to a second end 24 between opposing sides 26, which extend in approximate parallel spaced relations to one another. The frame 20 also includes a top 28 and a bottom 30. The platform frame 20 also includes a hollow interior 32 of the frame 20 and a plurality of access features 34, which enable access to the hollow interior 32.

Additionally, and in the arrangement shown, the platform frame 20 includes a plurality of attachment features 36. In the arrangement shown, some of the attachment features 34 are apertures designed to accept and/or receive pins therein. Pins and/or locking mechanisms enable other items to be attached to the platform, such as exercise equipment. Similarly, attachment features 36 enable different arrangements and assemblies of the frame to be accommodated. Similarly, attachment features 36 are configured for construction and/or assembly of the frame and/or accommodation of different assemblies of the frame itself. This is especially apparent in the figures, with reference to how the pillars (to be further described herein) are secured to the frame 20.

In the arrangement shown, frame 20 includes various pins and/or locking pins. Pins are formed of any suitable size, shape, and design and are configured to provide functionality of system 10. Additionally, pins are configured to provide various attachment features and various locations for attaching equipment, and the like. In this way, the pins provide for 360 degrees of attachment for equipment, such as exercise bands, resistance bands, and the like.

Furthermore, and in the arrangement shown as one example, the frame 20 also includes a threshold 38. Threshold 38 is configured to fill a gap formed between the plurality of platforms and the center pillars. Said another way, the threshold 38 is configured to protect a user from getting hurt or dropping objects into the gap between the platforms and the center pillar. In the arrangement shown, as one example, the threshold 38 is formed of a rectangular rubber piece. However, other forms of threshold are hereby contemplated for use.

Similarly, in the arrangement shown, as one example, the frame 20 is formed of metal. However, other materials for the configuration and/or construction of the frame 20 are hereby contemplated for use. Some examples include, but are not limited to, polymers, enhanced polymers, metal alloys, fibers, carbon fibers, wood, a combination thereof, and the like. Furthermore, frame 20, as a sturdy material can be used, particularly when in certain positions for bouncing and/or holding heavy equipment. As one example, a medicine ball may be bounced and/or slammed against the platform and frame as an exercise.

Similarly, in the arrangement shown, as one example, frame 20 is considered to be one frame 20 but may be multiple frames and/or may be more than one frame 20 secured and/or unsecured to one another and/or lined up next to each other. In this way, multiple frames 20 can be safely utilized to increase the rehabilitation area. In this way, one frame is hereby contemplated for use. Similarly two frames are hereby contemplated, three frames, four frames, five frames, six frames, seven frames, or more.

Stable Top Platform:

In the arrangement shown, as one example, system 10 includes a stable top platform 40. Stable top platform 40 is formed of any suitable size, shape, and design and is configured to provide a safe and supportive platform for which a user engages during various exercises. The stable top platform 40 is configured and situated on top of the platform frame 20, in one arrangement shown. In this way, the stable top platform 40 is configured as a supportive frame for resisting forces.

In the arrangement shown, as one example, the stable top platform 40 is formed of a generally slender rectangular-like shape which is thin and mat-like. In this way, the stable top platform 40 functions as a safe and effective workout mat and/or platform. Furthermore, and in the arrangement shown as one example, the stable top platform 40 is configured to provide an enclosure for the hollow interior of the frame 20, in addition to providing a foldable surface and/or replaceable surface for storage, exchanges of material and the like.

In the arrangement shown, as one example, the stable top platform 40 extends a length from a first end 42 to a second end 44 between opposing sides 46. The stable top platform 40 also includes a top 48 and a bottom 50. The stable top platform 40 also includes a plurality of attachment features 52 for securing the stable top platform 40 to the frame 20. In some arrangements, it is also contemplated that this is a frictional and/or force fit in which the platform is held in place by the frame and/or gravity and/or the user.

Furthermore, and in the arrangement shown, the stable top platform 40 includes folding features 54. The folding features 54 are formed of any suitable size, shape, and design and are configured to provide a hinge-like functionality near the center of the platform frame which provides that the platform can be folded in a 90-degree configuration; with reference to the figures. Similarly, the stable top platform 40 includes hinge features 56 for the opening of the stable top platforms 40 for easily storing components and the like in the storage area within the hollow interior of the frame 20.

In the arrangement shown, as one example, the stable top platform 40 is formed of a rubber material. However, other materials for the configuration and/or construction of the frame 20 are hereby contemplated for use. Some examples include, but are not limited to, polymers, enhanced polymers, metal, metal alloys, fibers, carbon fibers, wood, a combination thereof, and the like.

Similarly, in the arrangement shown, as one example, the stable top platform 40 is considered to be one stable top platform 40 but may be multiple top platforms and/or may be more than one top platform 40 secured and/or unsecured to the frames and/or to one another and/or lined up next to each other. In this way, multiple stable top platforms 40 can be safely utilized to increase the rehabilitation area. In this way, one frame is hereby contemplated for use. Similarly, two stable top platforms may be contemplated, three stable top platforms, four stable top platforms, five stable top platforms, six stable top platforms, seven stable top platforms, or more.

First Center Pillar:

In the arrangement shown, as one example, system 10 includes a first center pillar 60. First center pillar 60 is formed of any suitable size, shape, and design and is configured to provide support for exercises and a crossbar and/or center bar (to be discussed further herein). In the arrangement shown as one example, the first center pillar 60 extends perpendicular to and/or upward from the frame 20. The first center pillar 60, in this way, provides the upward support to be used to attach exercise equipment to and/or attach a plurality of crossbars; crossbars which can subsequently be used in exercises and/or for attachment of equipment.

Furthermore, and in the arrangement shown, the first center pillar is configured to extend upward, telescopically or otherwise, and also twist and/or spin about a vertical axis. Similarly, in an alternative embodiment, the first center pillar 60 may also be configured to rotate downward such that the top of the pillar can be moved closer to the frame 20 while the bottom of the pillar 60 stays approximately in a centered location. These variations can be useful for various exercises In the arrangement shown, as one example, the first center pillar 60 includes a first end 62 (nearer the first end of the frame 20) and a second end 64 (nearer the second end of the frame 20). The first center pillar 60 also includes opposing sides 66 that form an approximate square or rectangular shape when viewed from the top. Alternative shapes are also contemplated for use. For example, the first center pillar 60 may also be circular in shape when viewed from the top, triangular in shape, or have another shape.

In the arrangement shown, the first center pillar 60 extends a length from the top 68 to the bottom 70 (the bottom being closer to the frame 20 and stable top platform 40). In the arrangement shown, the first center pillar 60 also includes a telescoping extension which can increase and/or decrease the height of the first center pillar 60.

In the arrangement shown, as one example, the first center pillar 60 (and plurality of extensions) include a plurality of attachment features 74. In the arrangement shown, as one example, the plurality of attachment feature 74 are similar to those found on the frame 20, in that they are designed to accept the attachment of various other components, including crossbars, and other workout and/or exercise equipment and/or medical equipment. In the arrangement shown, as one example, the plurality of attachment features are formed of apertures for accepting pins and the like. Similarly, the telescoping feature may utilize these apertures and/or pins in changing and/or adjusting the height of the extensions.

In this way, system 10 may also include a plurality of locking pins 76. Locking pins 76 can be utilized for changing the position and/or configurations of system 10, as well as attaching features and/or extending the heights of the plurality of extensions and/or telescoping features of system 10.

In the arrangement shown, as one example, the first center pillar 60 also includes a plurality of angle support features 98 (or simply "angle supports"). Angle supports 98 are located nearer the bottom 70 of the first center pillar 60. The angle supports 98 are formed and configured to secure the first center pillar 60 to the frame 20 and vice versa. In the arrangement shown, the angle supports 98 also include a plurality of attachment features and locking pins which allow the first center pillar 60 to be angled and/or modified to different angles of correspondence to the platform. In the arrangement shown, as one example, two angle support features 98 are utilized which face in approximately opposite direction, and in parallel to the opposing sides of the frame. In the arrangement shown, as one example, the angle support features 98 are near the opposing sides of the frame 20. Other arrangements and number of angle support features 98 are hereby contemplated for use.

In the arrangement shown, as one example, the first center pillar 60 is formed of metal and/or formed of the same and/or similar material as the frame 20. However, other materials for the configuration and/or construction of the first center pillar 60 are hereby contemplated for use. Some examples include, but are not limited to, polymers, enhanced polymers, metal, metal alloys, fibers, carbon fibers, wood, a combination thereof, and the like.

Similarly, in the arrangement shown, as one example, the first center pillar 60 is considered to be one first center pillar 60 but may be multiple pillars may be more than one first center pillar 60 secured and/or unsecured to the frames and/or to one another and/or lined up next to each other. In this way, multiple first center pillar 60 can be safely utilized to increase the rehabilitation area and/or provide additional configurations. In this way, one first center pillar is hereby contemplated for use. Similarly, two first center pillars are hereby contemplated for use, three first center pillars are hereby contemplated for use, or more.

Second Center Pillar:

In the arrangement shown, as one example, system 10 includes a second center pillar 80. Second center pillar 80 is formed of any suitable size, shape, and design and is configured to provide support for exercises and a crossbar and/or center bar (to be discussed further herein). In the arrangement shown as one example, the second center pillar 80 extends perpendicular to and/or upward from the frame 20. The second center pillar 80, in this way, provides the upward support to be used to attach exercise equipment to and/or attach a plurality of crossbars; crossbars which can subsequently be used in exercises and/or for attachment of equipment.

Furthermore, and in the arrangement shown, the second center pillar is configured to extend upward, telescopically or otherwise, and also twist and/or spin about a vertical axis. Similarly, in an alternative embodiment, the second center pillar 80 may also be configured to rotate downward such that the top of the pillar can be moved closer to the frame 20 while the bottom of the pillar 60 stays approximately in a centered location. These variations can be useful for various exercises In the arrangement shown, as one example, the second center pillar 80 includes a first end 62 (nearer the first end of the frame 20) and a second end 64 (nearer the second end of the frame 20). The second center pillar 80 also includes opposing sides 66 that form an approximate square or rectangular shape when viewed from the top. Alternative shapes are also contemplated for use. For example, the second center pillar 80 may also be circular in shape when viewed from the top, triangular in shape, or have another shape.

In the arrangement shown, the second center pillar 80 extends a length from the top 68 to the bottom 70 (the bottom being closer to the frame 20 and stable top platform 40). In the arrangement shown, the second center pillar 80 also includes a telescoping extension which can increase and/or decrease the height of the second center pillar 80.

In the arrangement shown, as one example, the second center pillar 80 (and plurality of extensions) include a plurality of attachment features 74. In the arrangement shown, as one example, the plurality of attachment feature 74 are similar to those found on the frame 20, in that they are designed to accept the attachment of various other components, including crossbars, and other workout and/or exercise equipment and/or medical equipment. In the arrangement shown, as one example, the plurality of attachment features are formed of apertures for accepting pins and the like. Similarly, the telescoping feature may utilize these apertures and/or pins in changing and/or adjusting the height of the extensions.

In this way, system 10 may also include a plurality of locking pins 76. Locking pins 76 can be utilized for changing the position and/or configurations of system 10, as well as attaching features and/or extending the heights of the plurality of extensions and/or telescoping features of system 10.

In the arrangement shown, as one example, the second center pillar 80 also includes a plurality of angle support features 98 (or simply "angle supports"). Angle supports 98 are located nearer the bottom 70 of the second center pillar 80. The angle supports 98 are formed and configured to secure the second center pillar 80 to the frame 20 and vice versa. In the arrangement shown, the angle supports 98 also include a plurality of attachment features and locking pins which allow the second center pillar 80 to be angled and/or modified to different angles of correspondence to the platform. In the arrangement shown, as one example, two angle support features 98 are utilized which face in approximately opposite direction, and in parallel to the opposing sides of the frame. In the arrangement shown, as one example, the angle support features 98 are near the opposing sides of the frame 20. Other arrangements and number of angle support features 98 are hereby contemplated for use.

In the arrangement shown, as one example, the second center pillar 80 is formed of metal and/or formed of the same and/or similar material as the frame 20. However, other materials for the configuration and/or construction of the second center pillar 80 are hereby contemplated for use. Some examples include, but are not limited to, polymers, enhanced polymers, metal, metal alloys, fibers, carbon fibers, wood, a combination thereof, and the like.

Similarly, in the arrangement shown, as one example, the second center pillar 80 is considered to be one second center pillar 80 but may be multiple pillars may be more than one second center pillar 80 secured and/or unsecured to the frames and/or to one another and/or lined up next to each other. In this way, multiple second center pillar 80 can be safely utilized to increase the rehabilitation area and/or provide additional configurations. In this way, one second center pillar is hereby contemplated for use. Similarly, two second center pillars are hereby contemplated for use, three second center pillars are hereby contemplated for use, or more.

First Crossbar:

In the arrangement shown, as one example, system 10 includes a first crossbar 100. First crossbar 100 is formed of any suitable size, shape, and design and is configured to provide support for exercises and/or equipment. Said another way, the first crossbar 100 is configured to accept equipment around and/or attached thereto and provide support. In the arrangement shown, as one example, the first crossbar 100 is secured and/or configured horizontally—attached to the first center pillar 60 and the second center pillar 80. In this way, the first crossbar 100 is configured between the cams of each the first and second center pillar while maintaining the ability to rotate and/or lock into position.

In the arrangement shown, as one example, the first crossbar 100 extends a length from a first end 102 (having a first end attachment feature 103 for attaching to the first center pillar 60) to a second end 104 (having a second end attachment feature 105 for attaching to the second center pillar 80). Furthermore, and in the arrangement shown, as one example, the first crossbar 100 includes an exterior surface 106 and a hollow interior 108. Alternatively, the crossbar may not have a hollow interior 108, depending on the material and construction and need.

In the arrangement shown, as one example, the exterior surface is relatively smooth and forms the first crossbar 100, which is generally circular in shape when viewed from the end. In the arrangement shown, as one example, this circular shape may be locked into position such that the bar can not rotate about the center axis of the circle, or the first crossbar 100 may be able to rotate freely about the center axis of the circle. Said another way, the crossbar can be secured at different levels of stiffness between the cams of each pillar with the ability to rotate, rotate with resistance of varying levels, and/or lock into position.

In the arrangement shown, as one example, the first crossbar 100 is formed of metal and/or formed of the same and/or similar material as the frame 20. However, the first crossbar 100 may also be formed of other materials. Some examples include, but are not limited to, polymers, enhanced polymers, metal, metal alloys, fibers, carbon fibers, wood, a combination thereof, and the like.

Similarly, in the arrangement shown, as one example, the first crossbar 100 is shown and may be utilized without any additional crossbars. However, multiple crossbars may be utilized. Said another way, multiple crossbars can be safely utilized to functionality and/or add to configuration options. In this way, one crossbar may be used. However, two crossbars may be utilized, three crossbars, four crossbars, five crossbars, or more.

Second Crossbar:

In the arrangement shown, as one example, system 10 includes a second crossbar 120. Second crossbar 120 is formed of any suitable size, shape, and design and is configured to provide support for exercises and/or equipment. Said another way, the second crossbar 120 is configured to accept equipment around and/or attached thereto and provide support. In the arrangement shown, as one example, the second crossbar 120 is secured and/or configured horizontally—attached to the first center pillar 60 and the second center pillar 80. In this way, the second crossbar 120 is configured between the cams of each the first and second center pillar while maintaining the ability to rotate and/or lock into position.

In the arrangement shown, as one example, the second crossbar 120 extends a length from a first end 122 (having a first end attachment feature 123 for attaching to the first center pillar 60) to a second end 124 (having a second end attachment feature 125 for attaching to the second center pillar 80). Furthermore, and in the arrangement shown, as one example, the second crossbar 120 includes an exterior surface 126 and a hollow interior 128. Alternatively, the crossbar may not have a hollow interior 128, depending on the material and construction and need.

In the arrangement shown, as one example, the exterior surface is relatively smooth and forms the second crossbar 120, which is generally circular in shape when viewed from the end. In the arrangement shown, as one example, this circular shape may be locked into position such that the bar can not rotate about the center axis of the circle, or the second crossbar 120 may be able to rotate freely about the center axis of the circle. Said another way, the crossbar can be secured at different levels of stiffness between the cams of each pillar with the ability to rotate, rotate with resistance of varying levels, and/or lock into position.

In the arrangement shown, as one example, the second crossbar 120 is formed of metal and/or formed of the same and/or similar material as the frame 20. However, the first crossbar 100 may also be formed of other materials. Some examples include, but are not limited to, polymers, enhanced polymers, metal, metal alloys, fibers, carbon fibers, wood, a combination thereof, and the like.

Similarly, in the arrangement shown, as one example, the first crossbar 100 and the second crossbar 120 are shown and may be utilized without any additional crossbars. However, multiple crossbars and/or no crossbars may be utilized. Said another way, multiple crossbars and/or no crossbars can be safely utilized to functionality and/or add to configuration options. In this way, zero crossbar may be used. However, three crossbars may be utilized, four crossbars, five crossbars, sex crossbars, or more.

Other Components:

In the arrangement shown, as one example, system 10 may also include a telescoping mechanism for each of the pillars. In this way, the pillars can extend to various heights and increase the number of configurations.

In another example, the center bar may also include a plurality of attachments and/or attachment features such that various activation and release exercises can be attached in a variety of ways. Similarly, multiple pieces of equipment may be attached at once such that a user can move easily and quickly from one piece of equipment and engage a second piece of equipment quickly and easily.

In another example, a support system may be included. The support system is designed and configured to slide into the platform further stabilizing the platform base. In other words, the support system may be extensions in every direction, in some directions, or may be extensions which go downward such as feet, and/or extended feet, to increase stability of the system and safety of the equipment.

In another example, various platform materials may be utilized for different purposes. In some instances, a soft material with a low rigidity factor may be utilized. However, this material may need to be changed out quickly with a high rigidity factor material for a different type of exercise.

In the arrangement shown, as one example, these and other arrangements are hereby contemplated. Other materials and/or components also hereby contemplated for use—which are apparent from the disclosure and figures provided—include, but are not limited to, a full and/or partial assembly of the system 10 having an upright frame weldment, a plurality of posts, a plurality of gussets, a plurality of channels, a plurality of caps, a plurality of plungers—pins, a plurality of nuts, a plurality of welds, and a plurality of knobs, among other components, features and functionality.

Furthermore, and in the arrangement shown as one example, other materials and/or components also hereby contemplated for use—which are apparent from the disclosure and figures provided—including, but not limited to, a foldable floor ramp assembly having a wood platform, a stiffener, a folding frame, a bracket, a pivot, a stiffener with apertures, a wood platform folding frame, a wheel chair ramp, a leveling pad, a plurality of nuts, a plurality of latches, a plurality of hinges, a plurality of washers, a plurality of screws, a plurality of fasteners, a plurality of hinges, a plurality of bolts, nuts, and washers, a plurality of strips (made of neoprene or otherwise), and a plurality of rivets, among other components, features, and functionality.

Furthermore, and in the arrangement shown as one example, other materials and/or components also hereby contemplated for use—which are apparent from the disclosure and figures provided—including, but not limited to, a foldable floor assembly without a ramp having a platform, a stiffener, a bracket, a pivot, a stiffener, a hing, a folding frame, a leveling pad, a nut, a latch, a catch, a hing, a bolt, a nut, a washer, a screw, a strip, a rivet, and a washer, or a plurality of any thereof, among other components, features, and functionality.

Furthermore, and in the arrangement shown as one example, other materials and/or components also hereby contemplated for use—which are apparent from the disclosure and figures provided—including, but not limited to, a rotating bar assembly having a plurality of bar mounts with or without pins, a mount, a stock, a tube, a bracket, a plunger, a bolt, a washer, a bearing, a nut, a handle, a tubing, a rotating bar end, a spring, or a plurality of any thereof, among other components, features, and functionality.

Furthermore, and in the arrangement shown as one example, other materials and/or components also hereby contemplated for use—which are apparent from the disclosure and figures provided—including, but not limited to, a barbell support assembly having a support, a weight, a plate, a pin, a pivot, a screw, or a plurality of any thereof, among other components, features, and functionality.

Furthermore, and in the arrangement shown as one example, other materials and/or components also hereby contemplated for use—which are apparent from the disclosure and figures provided—including, but not limited to, a pull-up bar assembly having a bar, a pull-up, a bracket, a mounting system, an adjustable upright, a spacer, a folding platform pivot, or a plurality of any thereof, among other components, features, and functionality.

Furthermore, and in the arrangement shown as one example, other materials and/or components also hereby contemplated for use—which are apparent from the disclosure and figures provided—including, but not limited to, a transport roller assembly having a plurality of sides of a transport roller, an angle, a tube, a wheel, an abdominal wheel (or "ab wheel"), a bearing, a bolt, a nut, a pivot bolt, a pivot nut, a washer, a pull-up bar, a pull-up bar mount, a leveling pad, or a plurality of any thereof, among other components, features, and functionality.

Furthermore, and in the arrangement shown as one example, system 10 may also include an accessible ramp. Accessible ramp is formed of any suitable size, shape, and design and is configured to provide access to system 10. Access is provided by a generally smooth surface to provide a means for accessing system 10 by wheelchair, and the like.

Furthermore, and in the arrangement shown, as one example, an accessible ramp also provides a platform for various exercise purposes. For example, the ramp provides an angled ramp which can be engaged for body weighted squats, squats, heel raises and/or calf raises, among other exercise engagements.

In addition to the above identified features, options, controls, and components, system 10 may also include other features and functionalities, among other options, controls, and components.

In Operation:

In one example, various components and/or equipment may be included and/or connected to system 10 to carry out exercises, medical or non-medical.

It will be appreciated by those skilled in the art that other various modifications could be made to the system, process, and method of use without parting from the spirit and scope of this disclosure. All such modifications and changes fall within the scope of the claims and are intended to be covered thereby.

What is claimed:

1. A rehabilitative system, comprising:

a platform frame;

the platform frame extending a length from a first end to a second end thereof;

the platform frame having opposing sides;

the platform frame having a top and a bottom;

the platform frame having a hollow interior;

the platform frame having a storage compartment;

the platform frame having a plurality of access features;

a stable top platform;

the stable top platform extending a length from a first end to a second end thereof;

the stable top platform having opposing sides;

wherein the stable top platform engages the platform frame;

the stable top platform having a top and a bottom;

a first center pillar;

the first center pillar having a first end and a second end;

the first center pillar having opposing sides;

the first center pillar extending a length from a top to a bottom thereof;

the first center pillar having at least one telescoping extension;

the first center pillar having a locking pin;

wherein the locking pin is configured to secure the at least one telescoping extension at various extension lengths;

the first center pillar having a plurality of angle support features;

wherein the plurality of angle support features provide support for the first center pillar:

wherein the plurality of angle support features provide adjustment capabilities for the first center pillar such that the first center pillar can change orientation with respect to the platform frame;

the platform frame having a lip which holds the stable top platform along edges thereof;

wherein the stable top platform is secured by gravity, and a weight of the stable top platform, to the platform frame.

2. A rehabilitative system, comprising:

a platform frame;

the platform frame extending a length from a first end to a second end thereof;

the platform frame having opposing sides;

the platform frame having a top and a bottom;

the platform frame having a hollow interior;

the platform frame having a storage compartment;

the platform frame having a plurality of access features;

a stable top platform;

the stable top platform extending a length from a first end to a second end thereof;

the stable top platform having opposing sides;

wherein the stable top platform engages the platform frame;

the stable top platform having a top and a bottom;

a first center pillar;
the first center pillar having a first end and a second end;
the first center pillar having opposing sides;
the first center pillar extending a length from a top to a bottom thereof;
the first center pillar having at least one telescoping extension;
the first center pillar having a locking pin;
wherein the locking pin is configured to secure the at least one telescoping extension at various extension lengths;
the first center pillar having a plurality of angle support features;
wherein the plurality of angle support features provide support for the first center pillar;
wherein the the plurality of angle support features provide adjustment capabilities for the first center pillar such that the first center pillar can change orientation with respect to the platform frame;
the stable top platform having a plurality of folding features;
the stable top platform having a plurality of hinge features.

3. A muscle release and activation platform, comprising:
a first platform frame;
the first platform frame extending a length from a first end to a second end thereof;
the first platform frame having opposing sides;
wherein the opposing sides of the first platform frame run in approximately parallel spaced relation to one another;
wherein the first platform frame is generally rectangular in shape;
the first platform frame having a top and a bottom;
the first platform frame having a hollow interior;
the first platform frame having a storage compartment;
the first platform frame having a plurality of access features;
a first stable top platform;
the first stable top platform extending a length from a first end to a second end thereof;
the first stable top platform having opposing sides;
wherein the opposing sides of the first stable top platform run in approximately parallel spaced relation to one another;
wherein the first stable top platform is generally rectangular in shape;
wherein the first stable top platform engages the first platform frame;
the first stable top platform having a top and a bottom;
the first stable top platform having a plurality of attachment features;
a first center pillar;
the first center pillar having a first end and a second end;
the first center pillar having opposing sides;
the first center pillar extending a length from a top to a bottom thereof;
the first center pillar having at least one telescoping extension;
the first center pillar having a plurality of attachment features;
wherein the plurality of attachment features secure exercise equipment to the first center pillar;
the first center pillar having a locking pin;
wherein the locking pin is configured to secure the at least one telescoping extension at various extension lengths;
the first center pillar having a plurality of angle support features;
wherein the plurality of angle support features provide support for the first center pillar;
wherein the plurality of angle support features provide adjustment capabilities for the first center pillar such that the first center pillar can change orientation with respect to the platform frame;
a second center pillar;
the second center pillar having a first end and a second end;
the second center pillar having opposing sides;
the second center pillar extending a length from a top to a bottom thereof;
the second center pillar having at least one telescoping extension;
the second center pillar having a plurality of attachment features;
wherein the plurality of attachment features of the second center pillar secure the exercise equipment to the second center pillar;
the second center pillar having a locking pin;
wherein the locking pin of the second center pillar is configured to secure the at least one telescoping extension of the second center pillar at various extension lengths;
the second center pillar having a plurality of angle support features;
wherein the plurality of angle support features of the second center pillar provide support for the second center pillar;
wherein the angle support features provide adjustment capabilities for the second center pillar such that the second center pillar can change orientation with respect to the platform frame;
a first crossbar;
the first crossbar extending a length from a first end to a second end thereof;
the first crossbar having an attachment feature at the first end;
the first crossbar having an attachment feature at the second end;
the first crossbar having an exterior surface;
the first crossbar having a hollow interior;
wherein the first crossbar is connected at the first end to the first center pillar;
wherein the first crossbar is connected at the second end to the second center pillar;
wherein the first crossbar can be put in an engaged position; wherein the engaged position prevents the first crossbar from spinning about a center axis thereof;
wherein the first crossbar can be put in a disengaged position; wherein the disengaged position allows the first crossbar to spin about the center axis.

4. The platform of claim of 3, further comprising:
a second platform frame;
the second platform frame extending a length from a first end to a second end thereof;
the second platform frame having opposing sides;
wherein the opposing sides of the second platform frame run in approximately parallel spaced relation to one another;

wherein the second platform frame is generally rectangular in shape;

the second platform frame having a top and a bottom;

the second platform frame having a hollow interior;

the second platform frame having a storage compartment;

the second platform frame having a plurality of access features;

a second stable top platform;

the second stable top platform extending a length from a first end to a second end thereof;

the second stable top platform having opposing sides;

wherein the opposing sides of the second stable top platform run in approximately parallel spaced relation to one another;

wherein the second stable top platform is generally rectangular in shape;

wherein the second stable top platform engages the second platform frame;

the second stable top platform having a top and a bottom;

the second stable top platform having a plurality of attachment features.

5. The platform of claim 3, further comprising:

a second crossbar;

the second crossbar extending a length from a first end to a second end thereof;

the second crossbar having an attachment feature at the first end;

the second crossbar having an attachment feature at the second end;

the second crossbar having an exterior surface;

the second crossbar having a hollow interior;

wherein the second crossbar is connected at the first end to the first center pillar;

wherein the second crossbar is connected at the second end to the second center pillar;

wherein the second crossbar can be put in an engaged position; wherein the engaged position prevents the second crossbar from spinning about a center axis thereof, wherein the second crossbar can be put in a disengaged position; wherein the disengaged position allows the second crossbar to spin about the center axis of the second crossbar.

* * * * *